United States Patent
Volkmann et al.

(10) Patent No.: US 10,652,118 B2
(45) Date of Patent: May 12, 2020

(54) METHOD APPARATUS AND SYSTEM FOR METHOD FOR START-UP OF MONITORING OF MONITOR OBJECTS IN A COMPUTER-INTEGRATED TELECOMMUNICATIONS ENVIRONMENT

(71) Applicant: Unify GmbH & Co. KG, Munich (DE)

(72) Inventors: Michael Volkmann, Herdecke (DE); Claus Rist, Bochum (DE)

(73) Assignee: Unify GmbH & Co. KG, Munich (DE)

( * ) Notice: Subject to any disclaimer, the term of this patent is extended or adjusted under 35 U.S.C. 154(b) by 145 days.

(21) Appl. No.: 15/752,466

(22) PCT Filed: Aug. 12, 2016

(86) PCT No.: PCT/EP2016/069277
§ 371 (c)(1),
(2) Date: Feb. 13, 2018

(87) PCT Pub. No.: WO2017/029233
PCT Pub. Date: Feb. 23, 2017

(65) Prior Publication Data
US 2019/0014027 A1   Jan. 10, 2019

(30) Foreign Application Priority Data

Aug. 14, 2015 (DE) .......................... 10 2015 010 706

(51) Int. Cl.
*G06F 15/16* (2006.01)
*H04L 12/26* (2006.01)
(Continued)

(52) U.S. Cl.
CPC ...... *H04L 43/0817* (2013.01); *H04L 41/0213* (2013.01); *H04L 41/0266* (2013.01);
(Continued)

(58) Field of Classification Search
CPC .................................................. H04L 43/0817
(Continued)

(56) References Cited

U.S. PATENT DOCUMENTS 7,266,758 B2   9/2007   Takeuchi et al.
7,440,393 B2   10/2008  Nilakantan et al.
(Continued)

FOREIGN PATENT DOCUMENTS

DE   10149983 A1   4/2003
DE   10151436 A1   5/2003
EP   3 029 917 A1   6/2016

OTHER PUBLICATIONS

Ecma: "Services for Computer Supported Telecommunications Applications (CSTA) Phase III", , Dec. 1, 2011 (Dec. 1, 2011), pp. 1-834, XP055308977, Retrieved from the Internet: URL:http://www.ecma-international.org/publications/files/ECMA-ST/ECMA-269.pdf (Year: 2011).*

(Continued)

*Primary Examiner* — Hamza N Algibhah
(74) *Attorney, Agent, or Firm* — Buchanan Ingersoll & Rooney PC

(57) ABSTRACT

The present invention relates to method of monitoring of monitor objects in a computer-integrated telecommunications environment. The method comprises, in an initial start-up phase: —upon a first-time establishment of an association between a first computing device (9) and a switching device (1) using a communication link, sending a first message (A) from the first computing device (9) to the switching device (1) to request an identification for all monitor objects that are to be monitored by the first computing device (9); —in response to the first message (A), sending a second message (B) from the switching device (1) to the first computing device (9), the second message (B) referring to a third message (C) to follow; —allocating (Continued)

monitor objects which the first computing device (9) is to monitor; and —sending the third message (C) from the switching device (1) to the first computing device (9), the third message (C) referring back to the second message (B), and as a single message including a list (deviceList) of all monitor objects allocated to the first computing device (9) for monitoring, wherein the list includes a parameter block for any allocated monitor object, said parameter block including information for enabling monitoring of the respective monitor object at the first computing device (9). The method may be adapted for additionally including one or more second computing devices (10) for monitoring. The invention also refers to an apparatus and a communication system adapted for implementing the method.

20 Claims, 11 Drawing Sheets

(51) Int. Cl.
    *H04L 12/24*     (2006.01)
    *H04L 12/931*     (2013.01)
    *H04M 3/42*     (2006.01)

(52) U.S. Cl.
    CPC ............ *H04L 43/065* (2013.01); *H04L 43/12* (2013.01); *H04L 49/20* (2013.01); *H04M 3/42323* (2013.01)

(58) Field of Classification Search
    USPC .......................................................... 709/223
    See application file for complete search history.

(56) References Cited

U.S. PATENT DOCUMENTS

| | | | |
|---|---|---|---|
| 8,775,617 B2 | 7/2014 | De Lemos et al. | |
| 9,749,422 B2* | 8/2017 | De Lemos | H04L 67/141 |
| 2005/0144505 A1* | 6/2005 | Takeuchi | H04L 41/0631 714/4.12 |
| 2008/0233949 A1* | 9/2008 | Voyer | H04W 24/02 455/424 |
| 2012/0275575 A1* | 11/2012 | Knight | H04M 3/2245 379/32.04 |
| 2013/0185445 A1 | 7/2013 | Larkin | |
| 2016/0164978 A1* | 6/2016 | De Lemos | H04L 67/141 709/204 |

OTHER PUBLICATIONS

ECMA: "Services for Computer Supported Telecommunications Applications (CSTA) Phase III", Dec. 1, 2011, pp. 1-834, http://www.ecma-international.org/publications/files/ECMA-ST/ECMA-269.pdf.

International Search Report and Written Opinion for PCT/EP2016/069277 filed Aug. 12, 2016, dated Oct. 19, 2016.

OpenScape Voice V8, Interface Manual: vol. 4, CSTA Interface, Description. Unify GmbH & Co. KG, Mar. 2015.

* cited by examiner

METHOD APPARATUS AND SYSTEM FOR METHOD FOR START-UP OF MONITORING OF MONITOR OBJECTS IN A COMPUTER-INTEGRATED TELECOMMUNICATIONS ENVIRONMENT

FIELD OF THE INVENTION

The present invention relates in general to the field of network communication. Specifically, the present invention relates to a method, an apparatus and a system for monitoring of monitor objects in a computer-integrated telecommunications environment.

BACKGROUND OF THE INVENTION

Networks connect electronic devices together and enable them to communicate with one another. The electronic devices may include terminal communication devices (e.g. smart phones, laptops, computers, tablets, etc.), servers, hosts (processing units such as computers, printers or other peripheral devices), controllers, switches, gateways, and other network elements. These electronic devices in the network communicate with each other through communication channels or links. Underlying these channels are various physical devices. Examples of the physical devices include adapters that connect various network elements to the network, a cable or a bus that connects the adapters to a port on a network hub, the network switches that provide connectivity to each network element and the cables or buses that interconnect these network switches.

Examples of networks and network elements are disclosed in DE 101 51 436 A1, DE 101 49 983 A1, U.S. Pat. No. 7,266,758 B2, U.S. Pat. No. 7,440,393 B2, or US 2013/0185445 A1. ECMA International standard 269 discloses examples of methods by which different network elements may communicate with each other. Monitoring of different network devices can occur in a network. For instance, under Computer Supported Telecommunications Applications (CSTA) standards, a computing function is often required to start individual device monitors for each device under its control. In many networks, compliance with the CSTA standards for performance of monitoring of different devices can involve significant network resources, which can add cost to the operation of the network and/or reduce the quality of network performance. For instance, in a large deployment, up to 100,000 service requests can be required to be made by a CSTA computing function and responses by a CSTA switching function to those requests may need to be processed in a serial fashion. Such a process can require pacing by the computing function and switching function in order to not overload the system with requests at the start-up phase of monitoring.

More specifically, during the start-up phase between a CSTA Server providing a switching function (SF) and a CSTA Client providing a computing function (CF), there are a large number of messages exchanged. These messages are mandatory in the prior art to synchronize both systems. The amount of messages is related to the number of devices configured in the CSTA Server (e.g. private branch exchange—PBX) and the information processed by the CSTA Client (e.g. third party application). In the sense of the present application, the CSTA Server may be taken as an equivalent of a switching device while the CSTA client may be taken as an equivalent of a computing device.

ECMA-269 defines the start-up messages which have to be used to synchronize a CSTA Client and a CSTA Server for each device of a CSTA domain. Due to the fact that the amount of messages is directly related to the number of configured devices the initial start-up at time T=0 might need a long time.

US 2013/0185445 A1 and a further known prior art not yet published teach how to optimize the start-up after an error situation at time T=n later than time T=0. I.e., an initial synchronization at time T=0 is presumed to have already been executed. This prior art does not allow to optimize the start-up and thereby the initial synchronization at time T=0. Furthermore, US 2013/0185445 A1 and the further prior art need an error-free operation guaranteed by the CSTA Server.

There are known "all-in-one" solutions like OSBiz where server, middleware and application are often sharing the same processor and build logical but not physical separated units. In such systems, a method as described above would be of no benefit because a system restart of an OSBiz is always like the initial start-up at time T=0 because the information needed a time T=n is not available.

An object of the present invention is to substantially reduce the number of CSTA messages which are exchanged between a CSTA Client and a CSTA Server during start-up at time T=0, thus speeding up the time to synchronize both systems.

SUMMARY OF THE INVENTION

The aforementioned object is solved by the features of the independent claims. Preferred embodiments and advantageous further developments are set forth in the dependent claims.

A basic idea of the present invention is to substantially reduce the number of CSTA messages which are exchanged between a CSTA Client and a CSTA Server during start-up at time T=0, thus speeding up the time to synchronize both systems, by using only one initial message for all devices of a CSTA domain instead of using several messages per device.

An aspect of the invention is a method of monitoring monitor objects in a computer-integrated telecommunications environment, said method comprising in an initial start-up phase:

upon a first-time establishment of an association between a first computing device and a switching device using a communication link, sending a first message from the first computing device to the switching device to request an identification for all monitor objects that are to be monitored by the first computing device;

in response to the first message, sending a second message from the switching device to the first computing device, the second message referring to a third message to follow;

allocating monitor objects which the first computing device is to monitor; and sending the third message from the switching device to the first computing device, the third message referring back to the second message, and as a single message including a list of all monitor objects allocated to the first computing device for monitoring, wherein the list comprises a parameter block for any allocated monitor object, said parameter block comprising information for enabling monitoring of the respective monitor object at the first computing device.

A computer-integrated telecommunications or computer-telephone integration (CTI) environment in the sense of the present invention may be any environment where telephony is accomplished, i.e., integrated or coordinated, by the use and/or help of computer installations and networks. Known CTI environments may use standards like CSTA, ACL-C, TAPI, or others. CSTA services may follow standards and recommendations such as provided by organizations like Ecma international. Devices, calls etc. involved in a CTI environment may be monitored. A monitor-object is an object within a CTI environment to be monitored. A monitor object may be of any conceivable category or type. In particular, a monitor object following, e.g., Ecma standardization, may be a device-object or call-object, and may be of device-type or call-type. Preferably, a computing device in the sense of the present invention is implemented as or implementing a CSTA client, and a switching device in the sense of the present invention is implemented as or implementing a CSTA server. Preferably, the allocating step is executed at the switching device. As the computing device requests information about all communication devices of a CSTA domain through one message, and the switching device includes information on all allocated communication devices within one other message, the amount of exchanged messages will be decreased. Therefore the start-up time at a time T=0 may be reduced dramatically, in the monitoring initiation process.

In a preferred embodiment, the method may provide that said parameter block for each allocated monitor object comprises
  an identifier,
  characterizing information such as a category, type and name, and
  a monitor reference configured such that events involving the respective monitor object are communicated by the switch device to the first computer device.

An identifier may be any character, string, number or bit series identifying a particular monitor object. It will be noted that single elements of the parameter blocks may be omitted unless unevitable for the function of the present invention. For example, a name may be omitted if only the identifier is used for addressing a particular monitor object.

In a preferred embodiment, the method may provide that the request for identifying monitor objects to be monitored by the first computing device in the first message from the first computing device to the switching device includes requesting for any type of monitor objects, in particular any device category.

In another preferred embodiment, the method may provide that the request for identifying monitor objects to be monitored by the first computing device in the first message from the first computing device to the switching device includes requesting for at least one selected category of monitor objects, in particular device category.

Other embodiments may include requesting for a particular, minimum, or maximum number of monitor objects to be monitored by the first computing device.

In specific embodiments, the method may comprise:
  requesting in the first message from the first computing device to the switching device for a call processing state of any allocated monitor objects;
  providing in the third message from the switching device to the first computing device information regarding a call processing state of any allocated monitor object participating in a call, said information being preferably included in the parameter block of each named device-object, wherein
    if an allocated monitor object is in idle state, said information for the respective monitor object comprises a parameter indicating so,
    while in all other cases said information for the respective monitor object comprises a reference to a fourth message to follow.

In that embodiments, the method may further comprise:
  for each allocated monitor object, if indicated by a reference in the third message, sending the fourth message from the switching device to the first computing device, said fourth message providing information about the calls associated with the respective monitor object, in particular device-object, participating in the specified call.

The call processing information may be provided in the form of a snapshot. In specific embodiments, the method may provide that the request for identifying monitor objects to be monitored by the first computing device in the first message from the first computing device to the switching device relates to
  device-objects representing communication devices connected to the switching device, and/or
  call-objects representing calls existing in the domain or sub-domain of the switching device or in the domain or sub-domain of any communication device connected to the switching device or anywhere else in a communication system the switching device belongs to.

In specific embodiments, the method may comprise:
  requesting in the first message from the first computing device to the switching device for feature status of one or more features of any allocated monitor objects; and
  providing in the third message from the switching device to the first computing device information indicating the requested feature status of each allocated monitor object, said information being preferably included in the parameter block of each allocated monitor object, wherein said feature status preferably refers to standard synchronization features for an application like a call centre, unified communication, or unified communication and collaboration application, and/or additional features.

In specific embodiments, the method may provide that said association establishment comprises starting an application session, preferably following an ECMA-354 standard.

In specific embodiments, the method may in an initial start-up phase further comprise:
  upon a first-time establishment of an association between at least one second computing device and the switching device using a communication link, sending a first message from each of the at least one second computing device to the switching device to request an identification for all monitor objects that are to be monitored by a respective second computing device;
  in response to the first message from each of the at least one second computing device to the switching device, sending a respective second message from the switching device to each of the at least one second computing device, the second message referring to a respective third message to follow;
  allocating monitor objects which each respective second computing device is to monitor; and
  sending the respective third message from the switching device to each of the at least one second computing device, each third message referring back to the respective second message, and as a single message comprising a list (deviceList) of all monitor objects allocated to the respective second computing device for monitoring, wherein the list comprises a parameter block for any allocated monitor object, said parameter block comprising information for enabling monitoring of the respective monitor object at the respective second computing device.

Here, allocation of monitor objects is preferably such that each monitor object is allocated to only one of the first computing device or one of the at least one second computing device for monitoring.

Other aspects of the present invention are a communication apparatus and communication system configured to implement the method as described above. A communication apparatus may be a computing device or a switching device. The communication system may comprise the switching device and/or at least one computing device. The apparatus and/or system may comprise means adapted for, in an initial start-up phase:

upon a first-time establishment of an association between a first computing device and a switching device using a communication link, sending a first message from the first computing device to the switching device to request an identification for all monitor objects that are to be monitored by the first computing device;

in response to the first message, sending a second message from the switching device to the first computing device, the second message referring to a third message to follow;

allocating monitor objects which the first computing device is to monitor; and sending the third message from the switching device to the first computing device, the third message referring back to the second message, and as a single message including a list of all monitor objects allocated to the first computing device for monitoring, wherein the list comprises a parameter block for any allocated monitor object, said parameter block comprising information for enabling monitoring of the respective monitor object at the first computing device. The aforementioned means may be embodied as physical installations, i.e., hardware, or software. The aforementioned means may be implemented in one apparatus, e.g., as different logical entities defined as a server or switching device and one or more clients or computing devices, or may be distributed over a plurality of devices having a server or switching function and a client or computing function. One apparatus representing one side of a messaging communication as described above may be adapted to provide another apparatus with functions which, when implemented at the other apparatus, enable the other apparatus to represent another side of the messaging communication. For example, a switching device acting as a server may provide a computing device acting as a client with the functions of the computing device's side of the messaging communication as described above.

The present invention may also be embodied by a software product for monitoring monitor objects in a computer-integrated telecommunications environment, said software product being stored on computer-readable medium, preferably being directly loadable into an internal memory of a computer, and including program code for performing the steps of any of the afore-described methods when said software product is executed by said computer, said computer preferably including or being embodied by or included in a server, preferably telecommunications server, client, desktop computer, portable computer, tablet, telephone, mobile phone, smart phone, PDA, or the like. The present invention may as well be embodied by a computer program including instructions causing a computer to perform the steps of the afore-described method when said computer program is loaded in or executed by said computer, or by a digital data carrier having electrically readable control signals which are designed to operate with a programmable computer, said control signals being designed and adapted to cause the computer to perform the steps of the afore-described method.

In any such cases, the computer may also be embodied by the apparatus or the system of the described aspect of the invention, a communication device such as a mobile phone, smart phone or the like, a server such as a conference server or the like, a personal computer or the like. The software product may be a plug-in, add-on, app or the like to be included in or used by or co-executed with a telecommunications application or the like, or may constitute a basic program of a telecommunication unit, conferencing unit, server, client, or the like.

Further features, objects, advantages, and details of the present invention will become more apparent from the following description of specific embodiments of the invention and respective illustration in the appended drawings. Obviously, features, objects, advantages, and details of a specific embodiment, its variations and modifications mutatis mutandis apply to other embodiments, variations and modifications unless such application obviously violates technical constraints or laws of nature. Embodiments may be combined with each other, and any combination of an embodiment with another embodiment as a whole or in terms of single features thereof may be assumed to constitute an embodiment of the invention.

Other details, objects, and advantages of the invention will become apparent from the following description of presently preferred exemplary embodiments.

BRIEF DESCRIPTION OF THE DRAWINGS

Exemplary devices, systems, and methods for providing and monitoring communications between multiple communication devices are shown in the accompanying drawings and certain exemplary methods of practicing the same are also illustrated therein. It should be understood that like reference numbers used in the drawings may identify like components.

DETAILED DESCRIPTION OF EXEMPLARY EMBODIMENTS

<Apparatus Aspects of a Communication System of the Present Invention>

Figure 1:
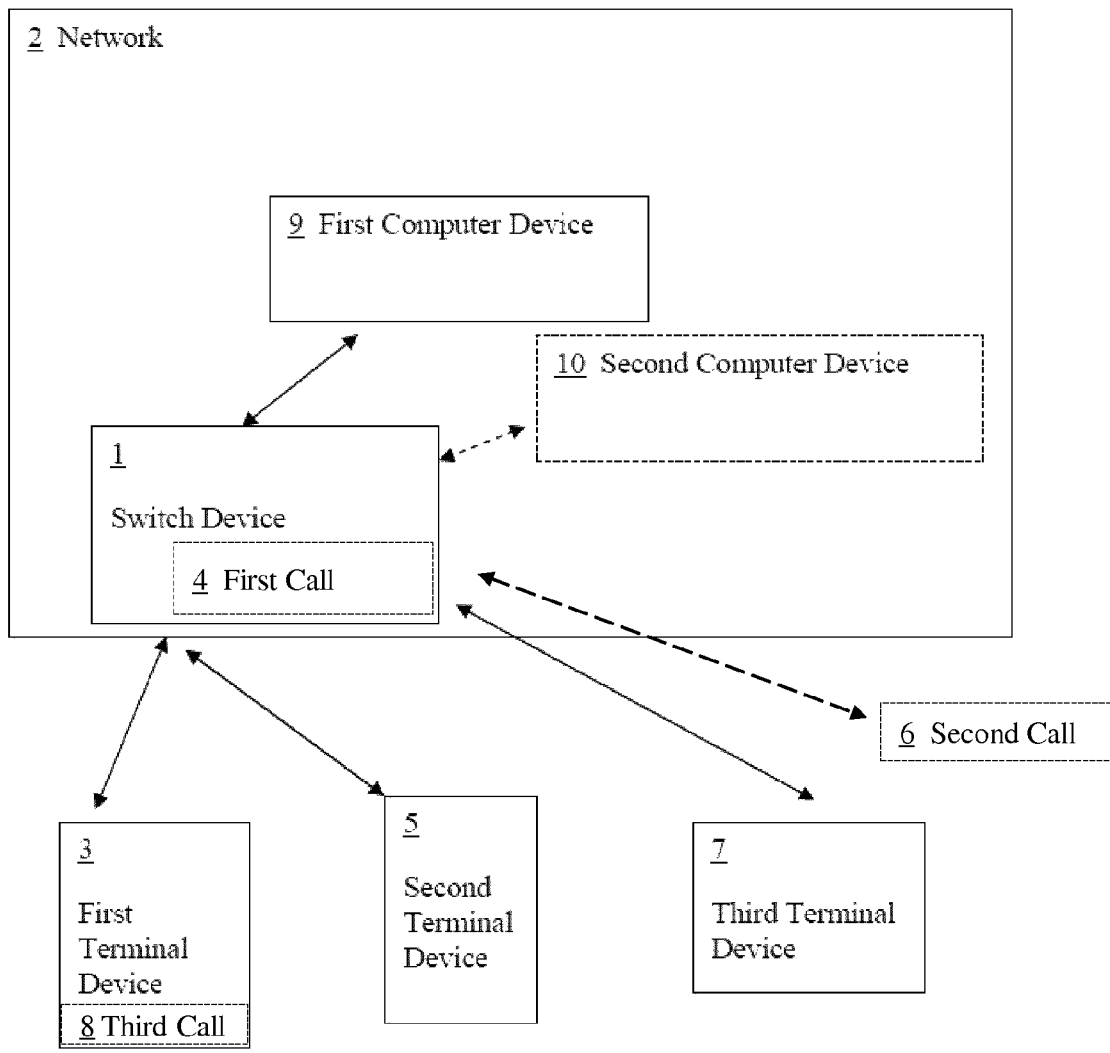
FIG. 1 is a block diagram of an exemplary embodiment of a communication system according to the present invention.
Figure 2:
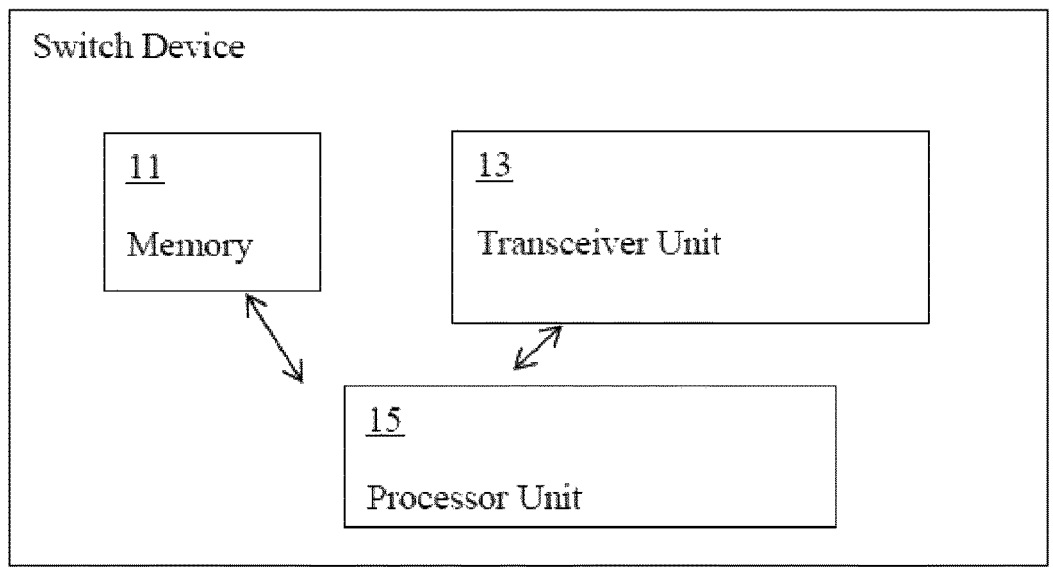
FIG. 2 is a block diagram of an exemplary embodiment of a switching device in the communication system of FIG. 1.
Figure 3:
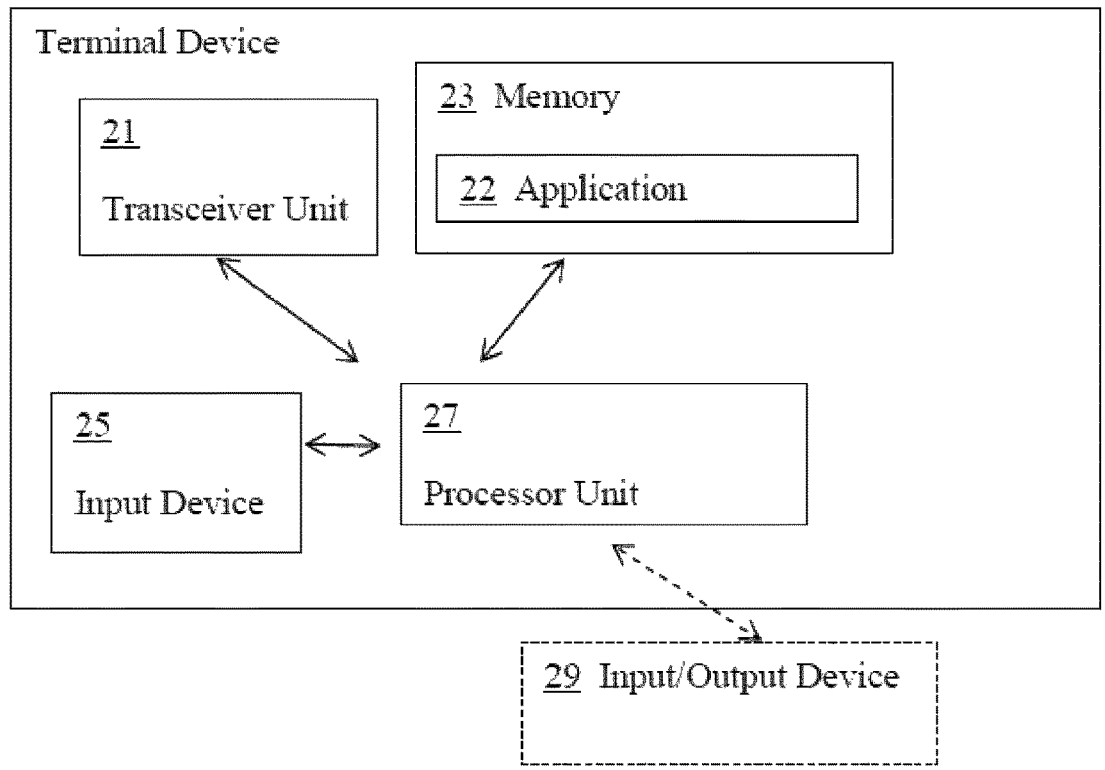
FIG. 3 is a block diagram of an exemplary embodiment of a terminal device in the communication system of FIG. 1.
Figure 4:
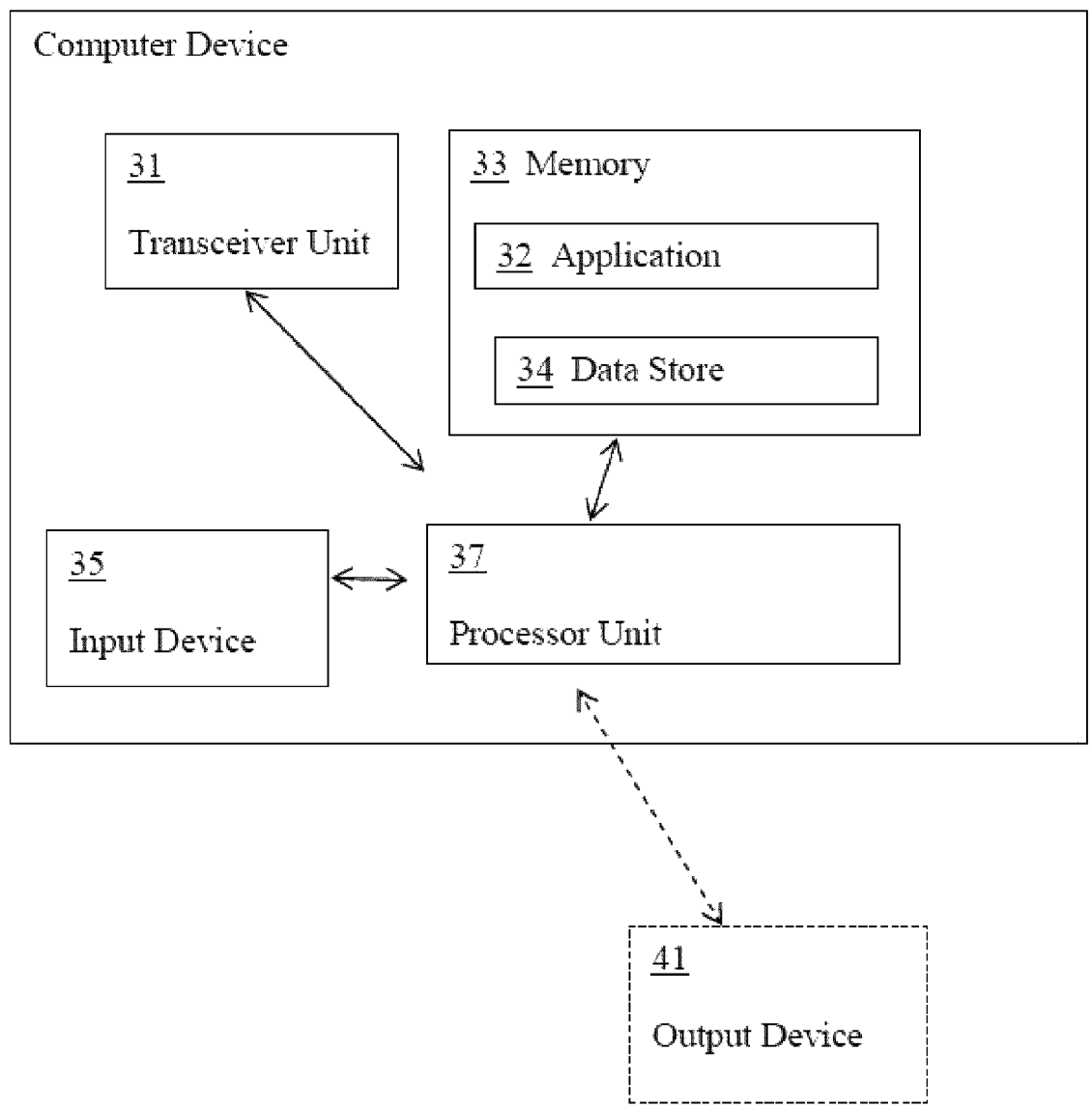
FIG. 4 is a block diagram of an exemplary embodiment of a computing device in the communication system of FIG. 1.

FIG. 1 shows a principle diagram of a communication system according to an exemplary embodiment of the present invention. The communication system of FIG. 1 can be understood of a computer-integrated telecommunication environment, in the sense of the present invention. FIGS. 2 to 4 are block diagrams of an exemplary switching device, an exemplary terminal device, and an exemplary computing device, respectively, in the communication system of this exemplary embodiment.

In the communication system shown in FIG. 1, a switching device 1 is included within a network 2. A first computing device 9 is communicatively connected to the switching device 1, within said network 2. In this exemplary embodiment, the switching device 1 is a branch exchange, such as a private branch exchange (PBX). However, the present invention is not limited to this. In particular, the swiching device may be any other type of branch exchange or, more generally, any other type of switching device. In this exemplary embodiment, the first computing device 9 is a server computing device such as a work station, a computer telephony integration (CTI) server computing device, or other computing device. The switching device 1 is configured as a switching function under the CSTA standard, and the first computing device 9 is configured as a computing function under the CSTA standard. A second computing device 10 is communicatively connected to the switching device 1. However, the present invention is not limited to this. In particular, the second computing device 10 is an option. The network 2 may include only the switching device 1 and the first computing device 9, or the switching device 1 and a deliberate number of computing devices such as first computing device 9 and second computing device 10. The second computing device 10 or any further computing devices may also be configured as a computing function under the CSTA standard.

The switching device 1 is communicatively connected to multiple communication devices such as a first terminal device 3, a second terminal device 5, and a third terminal device 7. Each terminal device 3, 5, 7 may be of any type of communication endpoint such as a personal computer, a user device, a laptop computer, a tablet, a telephone, a cellular phone, a smart phone, or a personal digital assistant (PDA). In other words, each terminal device is an example of a communication device in the sense of the present invention. The invention is however not limited to terminal devices in the closest meaning thereof. Communication devices may include any category and type of devices such as terminals, trunks and groups or any other device, especially any other CTI handable device. Any communication device such as terminal devices 3, 5, 7 may be addressed as device-object, and may be of any type or category of device-object.

Calls such a first call 4, a second call 6, and a third call 8, may be established in the domain or sub-domain of the switching device 1, or any terminal device 3, 5, 7, or anywhere within or outside the network 2 at an instance connected with switching device 1 or any terminal device 3, 5, 7. Any call 4, 6, 8 may represent a call which may be subject to control and/or monitoring in the communication system of this exemplary embodiment, and may be addressed as call-object of any type or category.

Any device-object or call-object mentioned above or anywhere in this specification may be understood as a monitor object in the sense of the present invention.

The network 2 can be configured as a corporate intranet, a local area network, a wide area network, or other type of network. The communication devices connected to the switching device may also be within the network 2 even though they are assumed to be outside of the network 2, but should be communicatively connectable to the switching device 1 of the network 2. The network 2 can be connected to the internet or other networks as well. In specific embodiments, the networks 2 can include other network elements such as one or more gateways, one or more access points, one or more network nodes, one or more database server computing devices, and/or one or more authentication servers.

FIG. 2 is a block diagram of an exemplary switching device representing switching device 1 in the communication system, according to an exemplary embodiment of the present invention.

As shown in FIG. 2, the switching device 1 of this exemplary embodiment includes hardware. The hardware of the switching device 1 includes a processor unit 15 that is communicatively connected to non-transitory memory 11 and at least one transceiver unit 13. The non-transitory memory 11 is configured such that one or more applications or other type of software can be stored on it. The processor unit 15 is configured to execute one or more applications stored in the memory 11 to cause the switching device 1 to perform different types of functions. The processor unit 15 can be any type of hardware processor such as a central processing unit (CPU), interconnected microprocessors, one or more core processors, or other type of hardware processor. The memory 11 may be flash memory, a hard drive, or other type of non-transitory storage device for storing electronic data such as, for example, files, applications, and databases. The transceiver unit 13 can include at least one receiver and at least one transmitter.

FIG. 3 is a block diagram of an exemplary terminal device representing any of terminal devices 3, 5, 7 in the communication system, according to an exemplary embodiment of the present invention.

It is to be noted that each terminal device in this exemplary embodiment also includes hardware. As shown in FIG. 3, a representative terminal device according to this exemplary embodiment includes a processor unit 27 that is communicatively connected to a transceiver unit 21, non-transitory memory 23, and at least one input device 25. The memory 23 is configured to store one or more applications 22 that are executable by the processor 27. One or more input devices, output devices or at least one input/output device 29 can optionally be communicatively connected to the processor 27. For instance, a touch screen display, monitor, microphone, video camera, or other device can be communicatively connected to the processor 27. The processor unit 27 can be any type of hardware processor such as a CPU, interconnected microprocessors, one or more core processors, or other type of hardware processor. The memory 23 may be flash memory, a hard drive, or other type of non-transitory storage device for storing electronic data such as, for example, files, applications, and databases. The transceiver unit 21 can include at least one receiver and at least one transmitter. The input device 25 can be, for example, a button, keyboard, key pad, mouse, pointer, stylus, microphone, a touch screen device or a type of input/output device. Each input/output device 29 can include a touch screen device or other type of input/output device. An output device can include a speaker, a display, a printer, other type of output device or a type of input/output device.

FIG. 4 is a block diagram of a computing device representing computing devices 9, 10 in the communication system according to an exemplary embodiment of the present invention.

It is to be noted that each computing device in this exemplary embodiment also includes hardware. As shown in FIG. 4, the representative computing device according to this exemplary embodiment comprises hardware that includes non-transitory memory 33, a transceiver unit 31, and at least one input device 35 that is communicatively connected to a processor unit 37. The memory 33 is configured to store at least one application 32 that is executable by the processor unit 37 and at least one database or other type of data store 34. At least one output device 41 or input/output device can optionally be connected to the computing device. The processor unit 37 can be any type of hardware processor such as a CPU, interconnected microprocessors, one or more core processors, or other type of hardware processor. The memory 33 may be flash memory, a hard drive, or other type of non-transitory storage device for storing electronic data such as, for example, files, applications, and databases. The transceiver unit 31 can include at least one receiver and at least one transmitter. Each input device 35 can be, for example, a button, keyboard, key pad, mouse, pointer, stylus, microphone, touch screen device or other type of input device or input/output device. The output device 41 can be a speaker, a display, a printer, other type of output device or a type of input/output device.

In this exemplary embodiment, the switching device 1 is configured to classify all communication devices in the communication system that have been enabled for implicit device monitoring for a pre-configured computing device (e.g. the first computing device 9 and/or second computing device 10). The device classification can be used to identify the type of users of the communication devices that the computing device wishes to monitor (e.g. all communication devices connected to the switching device, or all communication devices associated with users within a specific tenant group or users specifically licensed for services provided by the computing device, or any other group or kind of communication devices connected to the switching device 1). The switching device 1 can communicate with the first computing device 9 and/or second computing device 10 to associate each implicit device monitor with a trusted connection to a computing device.

The first computing device 9 in this exemplary embodiment is configured to establish a communication link or connection with the switching device 1 to perform monitoring of communication devices and functions of the network 2 or outside the network 2 that the communication devices may utilize via the switching device 1. After establishment of a communication link between the switching device 1 and the first computing device 9 (i.e., a first-time communication link), the first computing device 9 and switching device 1 are enabled to exchange messages to start an application and subsequently initiate first computing device monitoring. Likewise, after establishment of a communication link between the switching device 1 and the second computing device 10 (i.e., a first-time communication link), the second computing device 10 and switching device 1 are enabled to exchange messages to start an application and subsequently initiate second computing device monitoring. The communication links between the switching device 1 and the first and second computing devices 9, 10 may be, for example, a direct wired link, a direct wireless communication link, and/or a communication link that extends along a path that include multiple intermediate network nodes that may include wired transmission path segments and wireless transmission path segments.

<Process Aspects of a Start-Up Phase According to the Invention>

In the following, parts of a start-up phase of a monitoring process of monitor objects in a computer-integrated telecommunications environment will be described in detail.

A standard sequence for start-up of a communication system regularly includes:
  setting up the communication link between CSTA Client and CSTA Server;
  checking for configured communication devices in the CSTA domain;
  setting a CSTA monitor on a communication device with assignment of a CSTA MonitorCrossReference;
  checking for Call Processing state of a communication device;
  checking for feature activation/deactivation at a communication device.

As a basic solution aspect of the present invention, to reduce the start-up time of a CSTA Client a time T=0 dramatically, in the monitoring initiation process, the CSTA Client requests information about all relevant communication devices of a CSTA domain through one message. That means the amount of exchanged messages will be decreased.

It will be noted that where CSTA standards simply use the terminus "device", the terminus "communication device" will preferably be used within this specification so as to avoid confusing those devices with the switching device 1 or any of the first and second computing devices 9, 10. However, no further limitation to CSTA device definitions shall be implied by the terminus "communication device". It will be further noted that a CSTA server is represented by the switching device 1 of the present specification, and a CSTA client is represented by a computing device of the present specification.

To achieve compressing the standard synchronization in one message the CSTA Services GetSwitching FunctionDevices and SwitchingFunctionDevices are enhanced according to the description below. This enhancement is up today not part of the CSTA-Standard (e.g. ECMA-269), and may contain the aspects specified below.

<Enhancement of CSTA GetSwitchingFunctionDevices>

Within CSTA Service Request GetSwitchingFunctionDevices the Client adds which additional synchronize information has to be sent by the Server. This is done by Flags as further described in the following:

[CSTA MonitorStart]
TRUE: CSTA Event Report for all communication devices of the CSTA Domain should be started automatically
FALSE: no automatically start of monitoring CSTA ECMA-269 defines that per communication device a MonitorStart has to be sent to the Server, whereby the Server answers with the according MonitorCrossReference per communication device. This is normally done during start-up.

Through the implicit start of CSTA monitoring the message amount is reduced because only one message is needed for all communication devices instead of one message per communication device. The according CSTA MonitorCrossReferences will be part of CSTA SwitchingFunctionData which is the standard response of CSTA GetSwitchingFunctionDevices.

As an alternative the Monitor Start Flag can be a sort of bit list where the device categories of interest are selected.

[CSTA SnapshotDevice]
TRUE: automatic query and transport of the actual Call Processing state of all communication devices. If the Call Processing state is not idle the result will be send within CSTA standard response SnapshotDeviceData by generating a SnapshotDeviceCrossReference.
FALSE: no automatic CSTA SnapshotDevice For synchronizations issues CSTA ECMA-269 defines that per communication device a SnapshotDevice has to be sent to the Server, whereby the Server answers with the according Call Processing State or Snapshot DeviceCrossReference per communication device. This is normally done during start-up.

Through the implicit Call Processing state query the message amount is reduced because only one message is needed for all communication devices instead of one message per communication device.

Furthermore the CSTA Server will send only Snapshot Information to the CSTA Client if the communication device is not in state NULL. If the Call Processing state is NULL this information may be part of CSTA SwitchingFunctionData which is the standard response of CSTA GetSwitchingFunctionDevices.

[CSTA GetDoNotDisturb]
TRUE: automatic query and transport of the actual feature status "Do not Disturb" of all communication devices
FALSE: no transport of the actual feature status "Do not Disturb"

For synchronizations issues CSTA ECMA-269 defines that per communication device a GetDoNotDisturb has to be sent to the Server, whereby the Server answers with the according feature status per communication device. This is normally done during start-up.

Through the implicit feature status query the message amount is reduced because only one message is needed for all communication devices instead of one message per communication device. The feature status will be part of CSTA SwitchingFunctionData which is the standard response of CSTA GetSwitchingFunctionDevices.

[CSTA GetCallForwarding]
TRUE: automatic query and transport of the actual feature status "Call Forwarding" of all communication devices
FALSE: no transport of the actual feature status "Call Forwarding"

For synchronizations issues CSTA ECMA-269 defines that per communication device a GetCallForwaring has to be sent to the Server, whereby the Server answers with the according feature status per communication device. This is normally done during start-up.

Through the implicit feature status query the message amount is reduced because only one message is needed for all communication devices instead of one message per communication device.

<Enhancement of CSTA SwitchingFunctionDevices>

As a consequence of a CSTA Service GetSwitchingFunctionDevices the CSTA Server generates a sequence of CSTA SwitchingFunctionDevices. In conjunction with the prior definitions the content of CSTA SwitchingFunctionDevices is enhanced as follows:

[CSTA MonitorCrossReference]
The according CSTA MonitorCrossReferences will be part of CSTA SwitchingFunctionData if automatic monitoring is requested by CSTA GetSwitchingFunctionDevices.

This MonitorCrossReference is unique as required by ECMA-269 and used to assign a CSTA event to the according communication device.

[CSTA SnapshotDeviceCrossReference]
A CSTA SnapshotCrossReferences will be part of CSTA SwitchingFunctionData if the Call Processing state query is requested by CSTA GetSwitchingFunctionDevices and the Call Processing state is not NULL. The SnapshotCrossReferences is used to transport all other Call Processing states.

[DoNotDisturbState]
The flag DoNotDisturbState shows the status of the feature "Do Not Disturb" per communication device. This information will be sent if requested by GetSwitchingFunctionDevices.

[CallForwardingState]
The flag CallForwardingState shows the status of the feature "Call Forwarding" per communication device. This information will be sent if requested by GetSwitchingFunctionDevices (CSTA "getter" service).

If the feature is enabled at a communication device the Client has to request additional information via CSTA GetForwarding.

<Further Options>
[Additional Features]
The synchronization phase depends on the information needed by the CSTA Client. The examples described above may typically be used by Call Centre, UC and UCC applications. If for special solutions additional information is needed such as CSTA GetMessageWaitingIndicator or any other "getter" of ECMA-269 the implementation will follow one of the rules described above:
  the result is direct part SwitchingFunctionDevice as a Flag or Parameter (like DoNotDisturb);
  the result requires the ECMA-269 "getter" as additional service (like CallForwarding);
  the result is cross reference (like SnapshotDevice).

[Call Monitoring]
Beside device monitoring, CSTA allows call monitoring whereby monitors are set on calls but on communication devices. The afore-described enhancements of device monitoring will apply directly or mutatis mutandis with the same rules for call monitoring as well.

<Examples of Start-Up Process According to the Invention>

The start-up phase or start-up process of the communication system with a monitoring function will be described in the following, using exemplary embodiments of the present invention. The start-up process may be understood as part of a monitoring process per se and will be executed at a time T=0. The start-up process may be divided into a first part which will be referred to as an association establishment process (i.e., a first-time association establishment process), and a second part which will be referred to as a monitor start process (i.e., a first-time monitor start process), in the following. In any case, the start-up process starts out from an idle state where a physical communication link is already established.

[Association Establishment]

Figure 5:
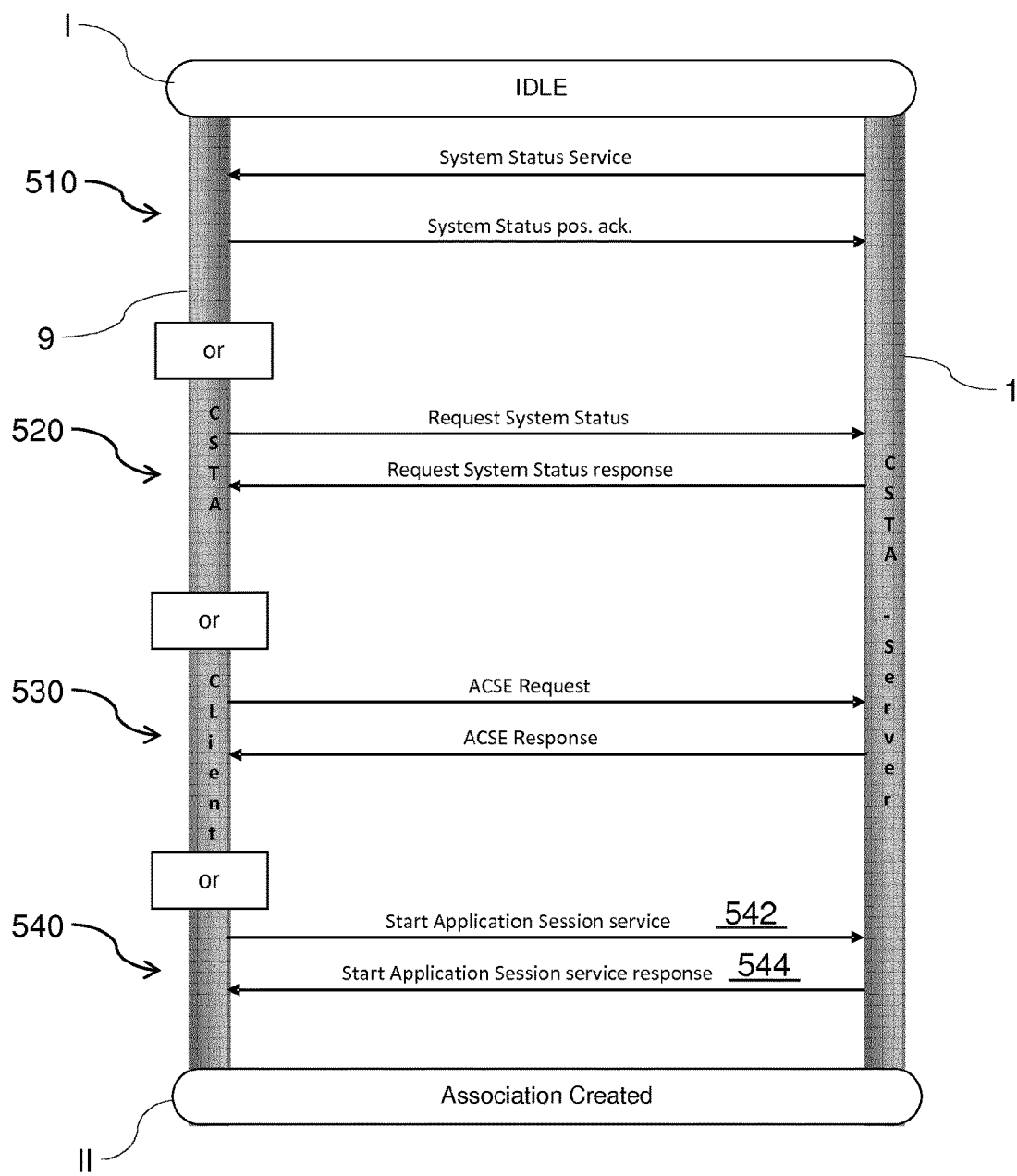
FIG. 5 is a schematic diagram illustrating communications exchanged between the switching device and a computing device in the communication system of FIG. 1, in an exemplary embodiment of an association establishment process according to the present invention.

FIG. 5 is a sequence diagram showing an association establishment process 500 between the first computing device 9 and the switching device 1 which have been described above, according to an exemplary embodiment of the present invention. The association establishment process 500 is realized by exchanging messages between the first computing device 9 and the switching device 1. In this exemplary embodiment of the invention, and in the following, the first computing device 9 is exemplified by a CSTA client, and the switching device 1 is exemplified by a CSTA server.

The association establishment process 500 starts from an IDLE state I. Then, the association establishment process 500 may provide four alternatives of execution.

To establish a first-time association between the CSTA Server and CSTA Client the association establishment process 500 may provide four execution alternatives or options following ECMA-269 standard:

1. an implicit association realized through the use of a CSTA Server initiated CSTA System Status service (execution alternative 510); or
2. an implicit association realized through the use of a CSTA Client initiated CSTA Request System Status service (execution alternative 520); or
3. an explicit association realized through the use of ACSE (execution alternative 530); or
4. an explicit association realized through the use of ecma Application Session Services according to ECMA-354 standard (execution alternative 540).

In a practical implementation of the method, any one or only some of or more than the execution options mentioned above may be offered or provided. As an example, the fourth of the aforementioned execution alternatives, i.e., execution alternative 540 using ECMA-354 standard, will be described in further detail, as a specific exemplary embodiment.

In this execution alternative, after the communication link is established between the first computing device 9 and the switching device 1, the first computing device 9 sends a service request message 542 to the switching device 1, and the switching device 1 responds to that service request message 542 by sending a service response message 544. The service request and response messages 542, 544 can be designed or architected based on the Application Session protocol to configure the use of the Application Session protocol for Application Session Services in compliance with CSTA standards. For instance, the service request message 542 can be configured (e.g. designed or architected) as a start application session request. The switching device 1 then sends a response to that service request message 542 as the service response message 544. The service response message 544 can be configured (e.g. designed or architected) as a start application session response. The service request message 542 can be configured (e.g. designed or architected) such that the switching device 1 associates a number of terminal devices such as terminal devices 3, 5, 7 as described above, that utilize the switching device's 1 resources with the application initiated via the service request message 542. For example, the service request message 542 can provide information to the switching device 1 so that the switching device 1 is able to identify the application to associate with the first computing device 9 and identify devices that can be associated with the application. The service response message 544 sent by the switching device 1 can be configured (e.g. designed or architected) to acknowledge receipt of that service request message 542 and indicate that the switching device 1 is able to allocate device monitoring for the communication devices associated with that application and the link established between the first computing device 9 and the switching device 1.

The association establishment process 500 ends with an association created state II. Once an association has been established, the CSTA Server function provided by switching device 1 is prepared to receive CSTA services. As mentioned above, the association establishment process 500 may be understood as first part of a start-up phase of a monitoring process for monitoring monitor devices in the communication system of FIG. 1.

[Monitor Start]

In the following, a number of exemplary embodiments of a monitor start part or process will be described which is a second part in a start-up phase of a monitoring process, this part following up on association establishment process 500 described above. Herein, the monitor start process of any exemplary embodiment will be described such that the fourth execution alternative 540 of association establishment process 500 (application session according to ECMA-354) as described above is presumed to have been employed beforehand. Thus, the monitor start process of any exemplary embodiment will start out from association-created state II.

All-Category Request

Figure 6:
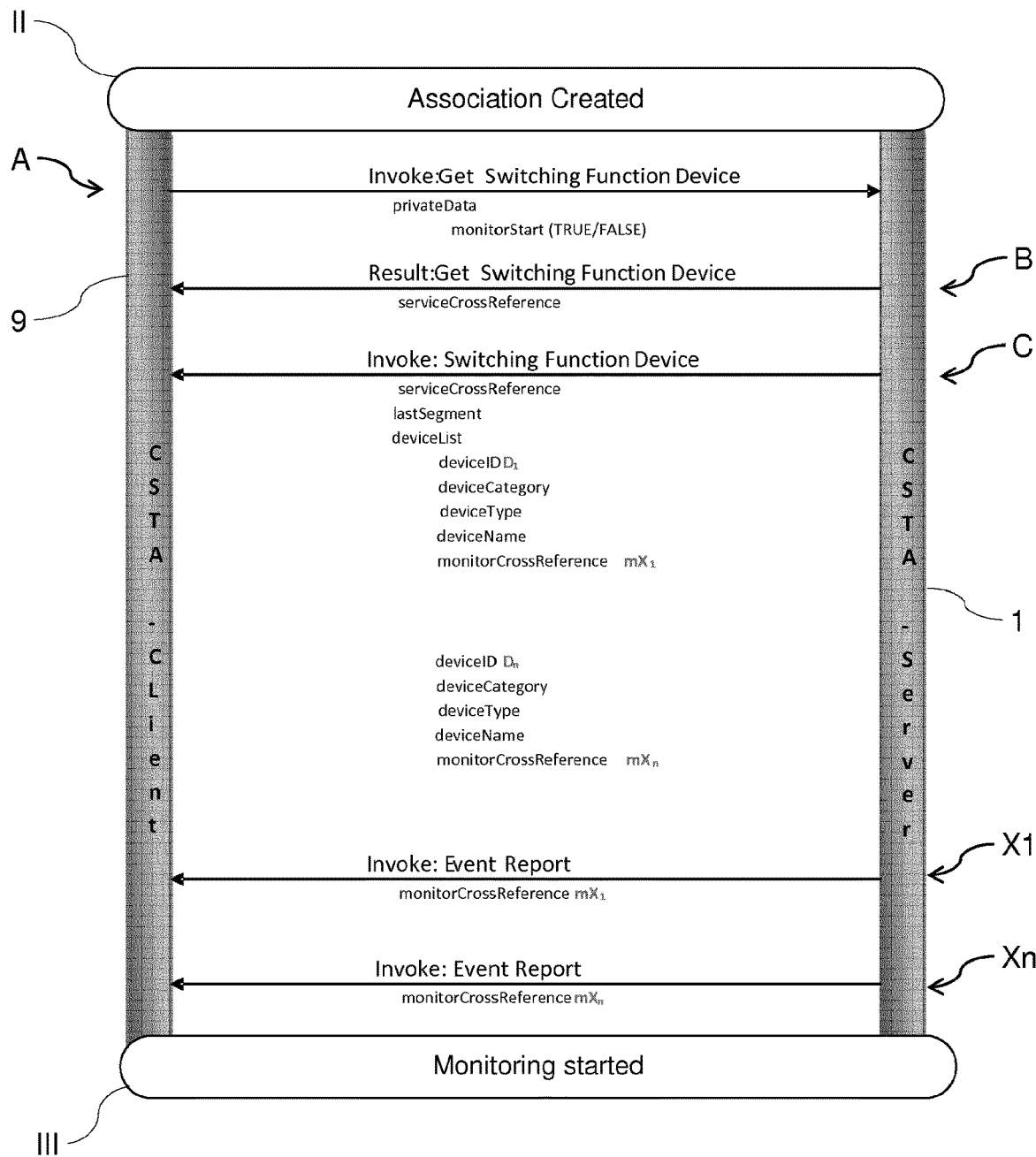
FIG. 6 is a schematic diagram illustrating communications exchanged between the switching device and a computing device in the communication system of FIG. 1, in an exemplary embodiment of a monitor start process according to the present invention.

FIG. 6 is a sequence diagram showing a monitor start process 600 between the CSTA client or first computing device 9 and the CSTA server or switching device 1 according to an exemplary embodiment of the present invention. In this exemplary embodiment, after the association is created, the CSTA client just requests monitoring for a deliberate number of devices of all device categories. This is accomplished by exchanging the messages described below.

After the association is completed in association establishment process 500, the first computing device 9 sends a first message A configured as a get switching function device message, which is configured (e.g. designed or architected) in structure and content as a request for the switching device 1 to identify communication devices connected to the switching device that are to be monitored by the first computing device 9. More specifically, within CSTA Service Request GetSwitchingFunctionDevices the computing device 9 adds CSTA MonitorStart flag as described above.

In response to the first message A, the switching device 1 sends a second message B back to first computing device 9. The second message B is an acknowledgement message configured as a get switching function devices response message. The second message B is configured to positively acknowledge receipt of the request of the first message A, and may acknowledge that at least one implicit device monitor has been configured (e.g., based on the exchanged service request and/or response messages 542, 544). Moreover, the second message B may refer to a third message to follow by a serviceCrossReference.

The switching device 1 then sends the third message C which refers back to the second message B by including the serviceCrossReference again. However, while in the prior art the serviceCrossReference is sent for every single communication device, here the serviceCrossReference is only sent for all communication devices to be monitored at once. More specifically, the third message C includes a listing of all of the communication devices to be monitored by the first computing device 9 (deviceList). The switching device 1 may decide (i.e., allocate) which communication devices are to be monitored by the first computing device 9, based on the application initiated via the service request and response messages 542, 544 exchanged during the association establishment execution alternative 540 described above. Alternatively, the switching device 1 may by default allocate every communication devices associated in the communication system to the first computing device 9 for monitoring. Any communication device allocated becomes a monitor object of first computing device 9, and is addressable as a CSTA device-object. In the present exemplary embodiment, n monitor objects (communication devices) mX1, . . . , mXn are allocated.

The listing of communication devices sent with the third message C includes a parameter block for all the monitor objects (i.e., communication devices addressed as CSTA device-objects) which are allocated for monitoring with the application associated with the first computing device 9 and the started applications session initiated via the service request and response messages 542, 544. The parameter block of each allocated device-object includes:

device identifications (deviceID);
device category identifier (deviceCategory)
device type identifier (deviceType);
device name identifier (deviceName); and
assigned cross-reference identifier (monitorCrossReference) that will be sent in subsequent events.

The monitor start process 600 is completed by the switching device 1 sending a first event report message X1, . . . , Xn for each monitor object mX1, . . . , mXn to the first computing device 9. Then, the monitor start process 600 ends with a monitoring-started state III.

As mentioned above, in the monitor start process of this exemplary embodiment, the CSTA Client just requests monitoring for a deliberate number of communication devices of all device categories, by just setting the CSTA MonitorStart Flag to TRUE or FALSE. Only one message is needed for all communication devices instead of one message per communication device. This will reduce the amount of CSTA MonitorStart sequences per communication device. Through the implicit start of CSTA monitoring the message amount as a whole is reduced. The according CSTA Monitor CrossReferences will be part of CSTA SwitchingFunctionData which is the standard response of CSTA GetSwitchingFunctionDevices.

Selected-Categories Request

Figure 7:
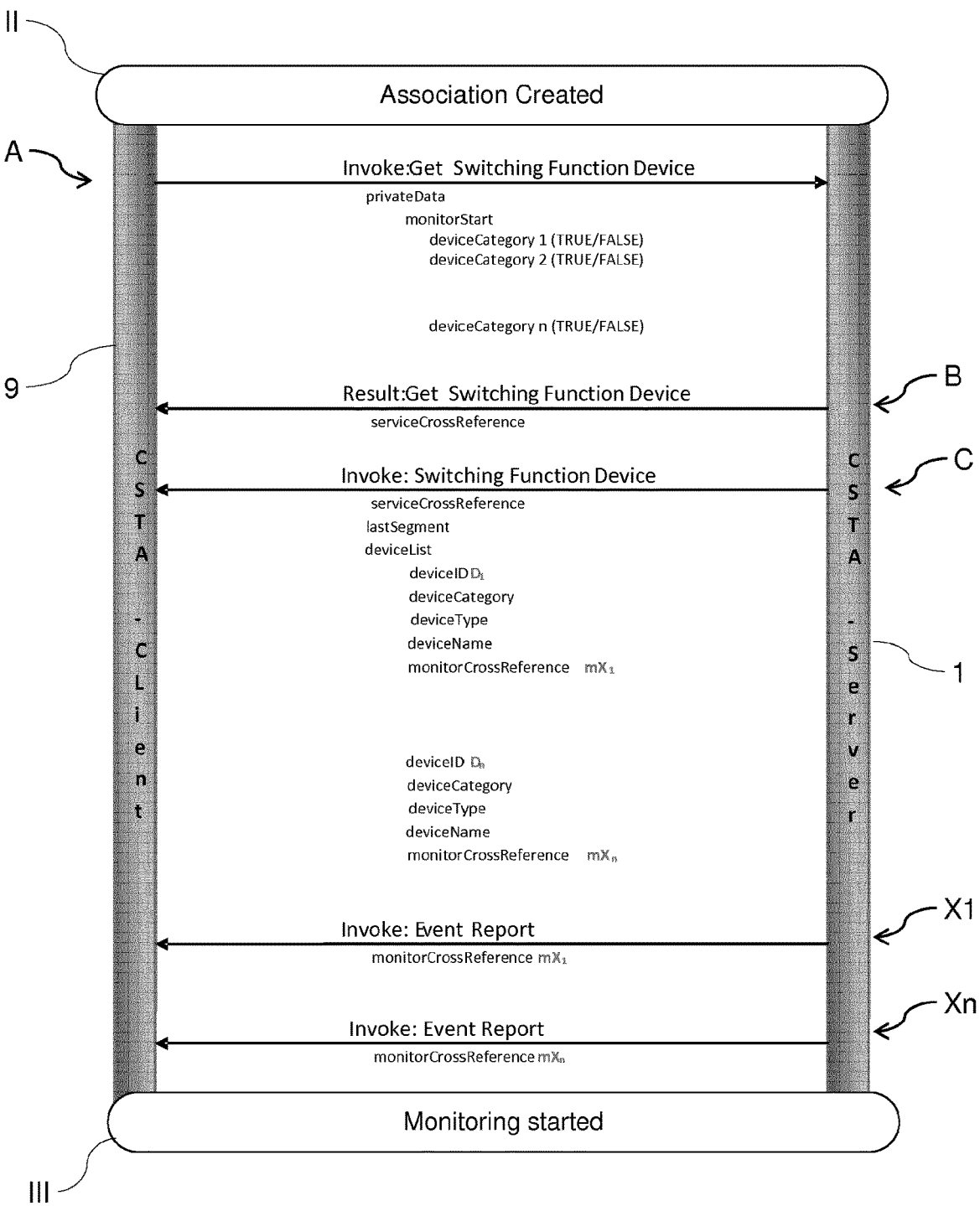
FIG. 7 is a schematic diagram illustrating communications exchanged between the switching device and a computing device in the communication system of FIG. 1, in another exemplary embodiment of a monitor start process according to the present invention.

FIG. 7 is a sequence diagram showing a monitor start process 700 between the CSTA client or first computing device 9 and the CSTA server or switching device 1 according to another exemplary embodiment of the present invention. It is to be noted that this exemplary embodiment is a variant of monitor start process 600 described above. Hence, mainly the differences from the latter will be described in detail, in the following, while any other aspects of monitor start process 600 may be presumed to apply to the present exemplary embodiment directly or mutatis mutandis, unless explicitly stated otherwise or obviously being in contradiction to the descriptions of the present exemplary embodiment.

Other than in the process 600 described above, in the monitor start process 700 of the present exemplary embodiment as shown in FIG. 7, after the association is created, the CSTA client does not request monitoring for devices of all categories but just requests monitoring of devices of selected device categories 1, 2, . . . . The number of selected device categories may be 1, 2, or more. This is accomplished by measures described below in the framework of messages exchanged which are similar to those exchanged in the monitor start process 600 of the previously-described exemplary embodiment.

After the association is completed in association establishment process 500, the first computing device 9 sends a first message A to the switching device which is similar to the first message A of the previous exemplary embodiment. I.e., the first message A is configured (e.g. designed or architected) in structure and content as a request for the switching device 1 to identify communication devices connected to the switching device that are to be monitored by the first computing device 9. In this exemplary embodiment, however, in contrast to the previous exemplary embodiment, the Monitor Start Flag is configured as a sort of bit list or flag list (deviceCategory1, deviceCategory2, . . . ) where the device categories of interest are selected, i.e., flagged TRUE while device categories to be skipped are unselected, i.e., flagged FALSE. In an embodiment variant, device categories to be skipped from being monitored by the first computing device 9 are just omitted.

As a result, in this exemplary embodiment, the request is limited to the selected device categories. The switching device 1 may again decide which communication devices are to be monitored by the first computing device 9, based on the application initiated via the service request and response messages 542, 544 exchanged during the association establishment execution alternative 540 described above, but is limited to the selection of device categories indicated in the first message A. Alternatively, the switching device 1 may by default associate any communication devices (monitor objects) found in the selected device categories.

Then, messages B, C, X1, . . . , Xn are exchanged right as in the previous exemplary embodiment so that reference is made to the description of process 600 described above in that regard. It will be noted that a symbol "n" in FIG. 7 is merely used as a deliberate end number, and "n" in the list of relevant categories in the first message A needs not to be equal to "n" in the list of allocated communication devices in the third message C.

The monitor start process 700 of this exemplary embodiment again ends with monitoring-started state III.

As mentioned above, in the monitor start process 700 of this exemplary embodiment, the CSTA Client just requests monitoring for devices of selected device categories. This will further reduce the amount of CSTA MonitorStart sequences per communication device.

Call Processing State Inclusion—Idle State

Figure 8:
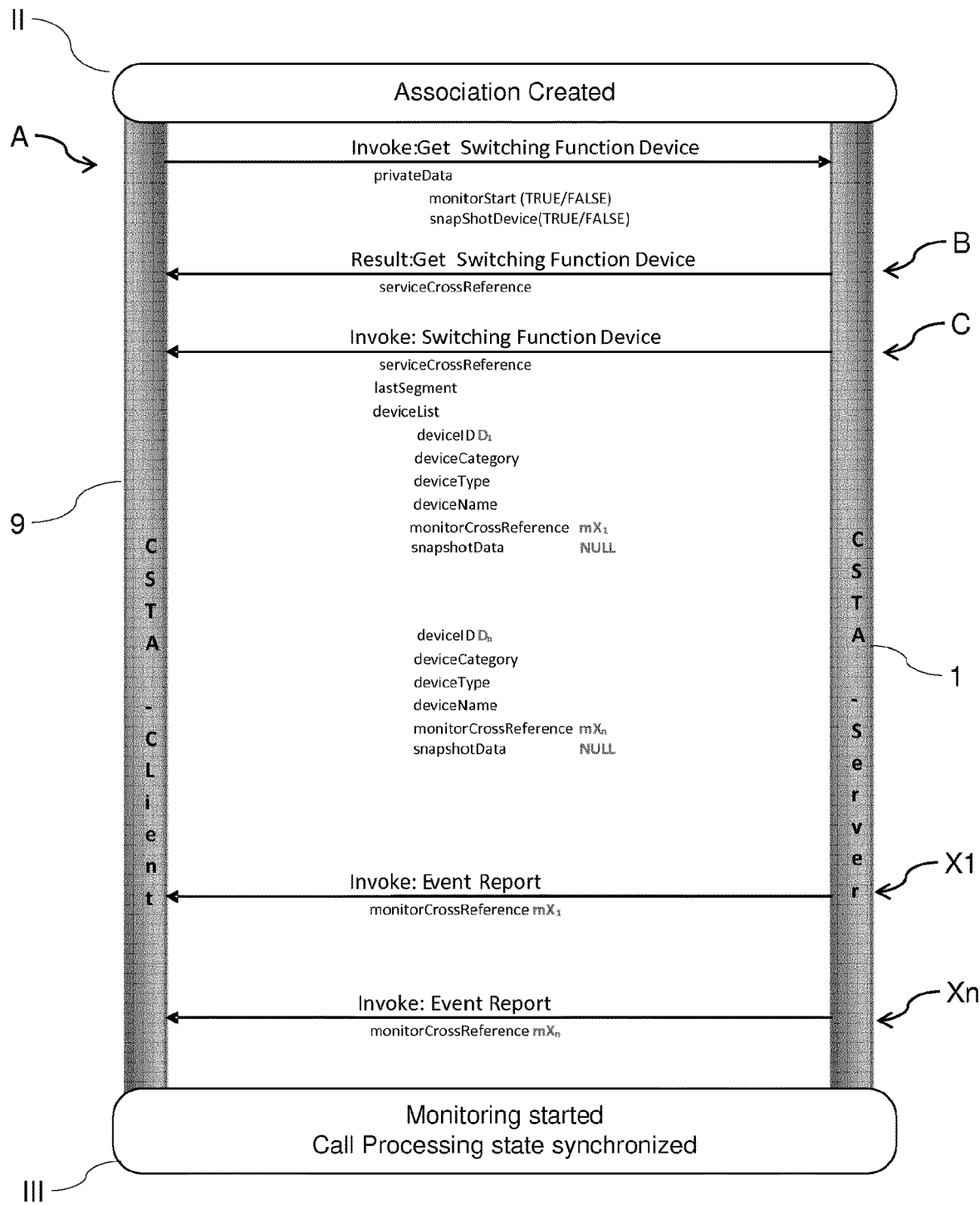
FIG. 8 is a schematic diagram illustrating communications exchanged between the switching device and a computing device in the communication system of FIG. 1, in yet another exemplary embodiment of a monitor start process according to the present invention.

FIG. 8 is a sequence diagram showing a monitor start process 800 between the CSTA client or first computing device 9 and the CSTA server or switching device 1 according to yet another embodiment of the present invention. It is to be noted that this exemplary embodiment is another variant of monitor start process 600 described above. Hence, mainly the differences from the latter will be described in detail, in the following, while any other aspects of monitor start process 600 may be presumed to apply to the present exemplary embodiment directly or mutatis mutandis, unless explicitly stated otherwise or obviously being in contradiction to the descriptions of the present exemplary embodiment.

Further to the process 600 described above, in the monitor start process 800 of this exemplary embodiment as shown in FIG. 8, after the association is created, the CSTA Client requests monitoring and, in addition, the Call Processing state for devices of any category which may be assumed as a minimum synchronisation for applications like Call Centre, UC and UCC (using SnapshotData-time T=0). This is accomplished by exchanging the messages described below.

After the association is completed in association establishment process 500, the first computing device 9 sends a first message A which is similar to the first message A sent in the monitor start process 600 previously described. I.e., the first message A is configured as a get switching function device message, which is configured (e.g. designed or architected) in structure and content as a request for the switching device 1 to identify communication devices connected to the switching device that are to be monitored by the first computing device 9 by means of a monitor start flag (monitorStart) set TRUE or FALSE as described above. In the present exemplary embodiment, in addition, the first message A is configured (e.g. designed or architected) in structure and content as a request for the switching device 1 to acquire a Call Processing state of any communication device connected to the switching device and to be monitored by the first computing device 9. This is done by including/setting a flag for CSTA SnapshotDevice as described above.

Then, messages B, C, X1, . . . , Xn are exchanged similar to those previously described so that reference is made to the description of process 600 described above in that regard. However, it is to be noted that in the present exemplary embodiment, the parameter block of each allocated monitor object (device to be monitored by the first computing device 9) in the third message C additionally includes a segment "snapshotData" indicating call processing state of each associated monitor object. In the present exemplary embodiment, it is assumed that the Call Processing state of any allocated monitor object (communication device) is idle. In this situation which may be evaluated by the CSTA server (i.e., the switching device 1), the CSTA server just includes a parameter snapshotData having the value NULL, in the parameter block of each allocated monitor object in the device list of the third message C.

The monitor start process 800 of this exemplary embodiment again ends with monitoring-started state III which in addition implies a call-processing-state-synchronized state. In other words, in this exemplary embodiment of the invention, Call Processing state synchronization in included in the monitor start process.

As mentioned above, in the monitor start process of this exemplary embodiment, the CSTA Client just requests monitoring for communication devices of any device categories and the Call Processing State thereof within one same message. Through the implicit Call Processing state query the message amount is reduced because only one message is needed for all communication devices instead of one message per communication device. Furthermore will the CSTA Server send no Snapshot Information to the CSTA Client if the device is in state NULL. This will reduce the amount of CSTA MonitorStart and SCTA SnapshotDevice sequences per communication device.

Call Processing State Inclusion—Non-Idle State

Figure 9:
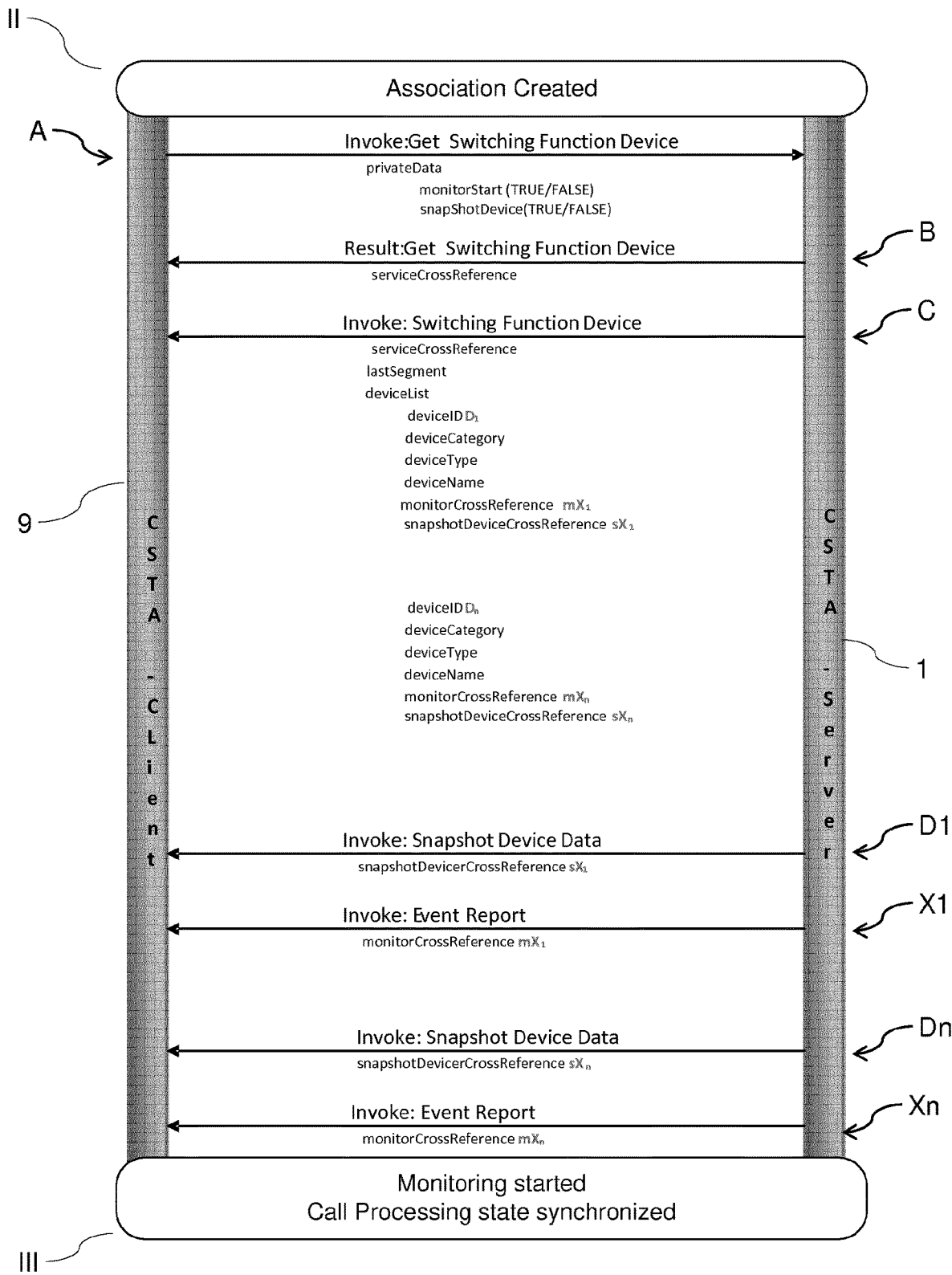
FIG. 9 is a schematic diagram illustrating communications exchanged between the switching device and a computing device in the communication system of FIG. 1, in a further exemplary embodiment of a monitor start process according to the present invention.

FIG. 9 is a sequence diagram showing a monitor start process 900 between the CSTA client or first computing device 9 and the CSTA server or switching device 1 according to a further exemplary embodiment of the present invention. It is to be noted that this exemplary embodiment is a variant of monitor start process 800 described above. Hence, mainly the differences from the latter will be described in detail, in the following, while any other aspects of monitor start process 800 may be presumed to apply to the present exemplary embodiment directly or mutatis mutandis, unless explicitly stated otherwise or obviously being in contradiction to the descriptions of the present exemplary embodiment.

Like in the process 800 described above, in this process 900 shown in FIG. 9, the CSTA Client (i.e., the first computing device 9) requests monitoring and the Call Processing state for devices of any category by sending, after the association is created, the first message A including the monitor start flag (monitorStart) and the CSTA snapshotDevice flag which may assume the state of TRUE and FALSE.

Unlike the process 800 of the previous exemplary embodiment, in the process 900 of the present exemplary embodiment the Call Processing state of the allocated monitor objects (communication devices) is not idle. In this situation which may be evaluated by the CSTA server (i.e., the switching device 1), the CSTA server will send the result within an individual fourth message D1, . . . , Dn for any allocated communication device the Call Processing state of which is not idle. The fourth messages D1, . . . , Dn represent a standard CSTA response SnapshotDeviceData. The fourth messages D1, . . . , Dn are referred to beforehand by the CSTA server by generating a SnapshotDeviceCrossReference sX1, . . . , sXn for any allocated communication device the Call Processing state of which is not idle, and including the respective SnapshotDeviceCrossReference sX1, . . . , sXn in each parameter block of the device list in the third message C. In each fourth message D1, . . . , Dn, then, reference is made to the third message C by including the respective SnapshotDeviceCrossReference sX1, . . . , sXn.

Each message D1, . . . , Dn is followed by the event report message X1, . . . , Xn of the respective monitor object as described above in the context of the monitor start process 600 so that reference is made to the description of that process 600 described above in that regard.

The monitor start process 900 of this exemplary embodiment again ends with monitoring-started state III which again implies a call-processing-state-synchronized state.

As mentioned above, in the monitor start process 900 of this exemplary embodiment, the CSTA Client just requests monitoring for devices of any device categories and the Call Processing State thereof within one same message. Through the implicit Call Processing state query the message amount is reduced because only one message is needed for all devices instead of one message per device. Furthermore will the CSTA Server send only Snapshot Information to the CSTA Client if the device is not in state NULL. If the Call Processing state is NULL this information may be part of CSTA SwitchingFunctionData which is the standard response of CSTA GetSwitchingFunctionDevices. This will reduce the amount of CSTA MonitorStart and SCTA SnapshotDevice sequences per device.

Standard Synchronization Inclusion

Figure 10:
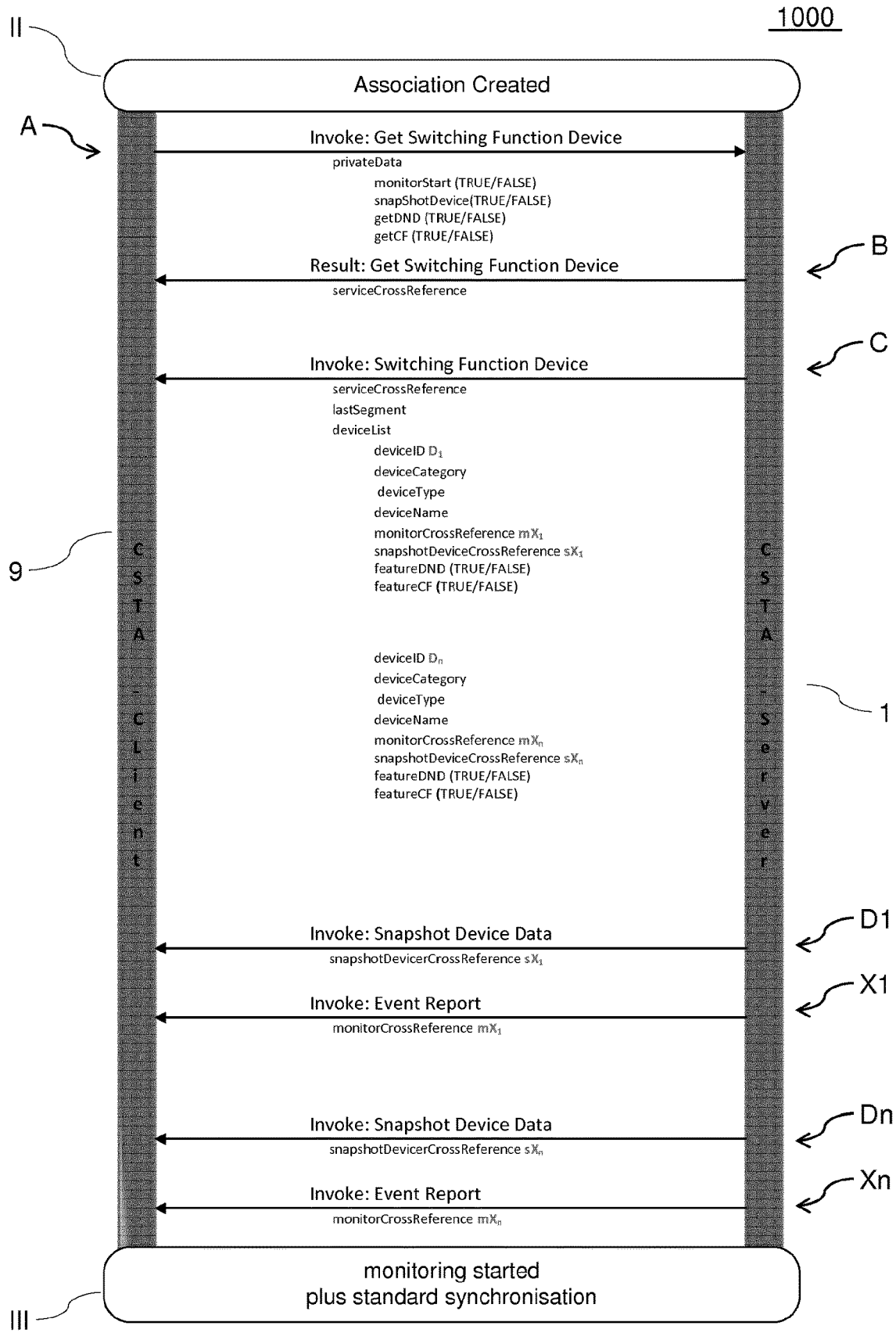
FIG. 10 is a schematic diagram illustrating communications exchanged between the switching device and computing device in the communication system of FIG. 1, in a yet further exemplary embodiment of a monitor start process according to the present invention.

FIG. 10 is a sequence diagram showing a monitor start process 1000 between the CSTA client or first computing device 9 and the CSTA server or switching device 1 according to a yet further exemplary embodiment of the present invention. It is to be noted that this exemplary embodiment is a variant of monitor start process 900 described above. Hence, mainly the differences from the latter will be described in detail, in the following, while any other aspects of monitor start process 900 may be presumed to apply to the present exemplary embodiment directly or mutatis mutandis, unless explicitly stated otherwise or obviously being in contradiction to the descriptions of the present exemplary embodiment.

Further to the monitor start process 900 described above, in the monitor start process 1000 of the present exemplary embodiment shown in FIG. 10, after the association is created, the CSTA Client requests monitoring and the Call Processing state for devices of any category and feature status which may be assumed as a standard synchronisation for applications like Call Centre, UC and UCC. This is accomplished by providing, in addition to the contents described afore, respective flags to the first message A sent to the switching device 1 by the first computing device 9. In the present exemplary embodiment, the requested features are DND and CF so that the flags included in the first message A are getDND and getCF which may be set TRUE or FALSE. For any requested feature, a respective parameter is added to the parameter block of any device to be monitored by the first computing device 9, in the device list of the third message C sent to the first computing device 9 by the switching device 1.

The other messages B, D1, X1, ..., Dn, Xn are similar to those in the previous exemplary embodiment so that reference is made to the respective descriptions.

The monitor start process 1000 of this exemplary embodiment again ends with monitoring-started state III which additionally implies a standard-synchronization-done state.

As mentioned above, in the monitor start process 1000 of this exemplary embodiment, the CSTA Client just requests monitoring for devices of any device categories and the Call Processing State thereof and further features within one same message. This will further reduce the amount of CSTA MonitorStart, CSTA SnapshotDevice and CSTA "getter" sequences per device.

Additional Feature Status Inclusion

Figure 11:
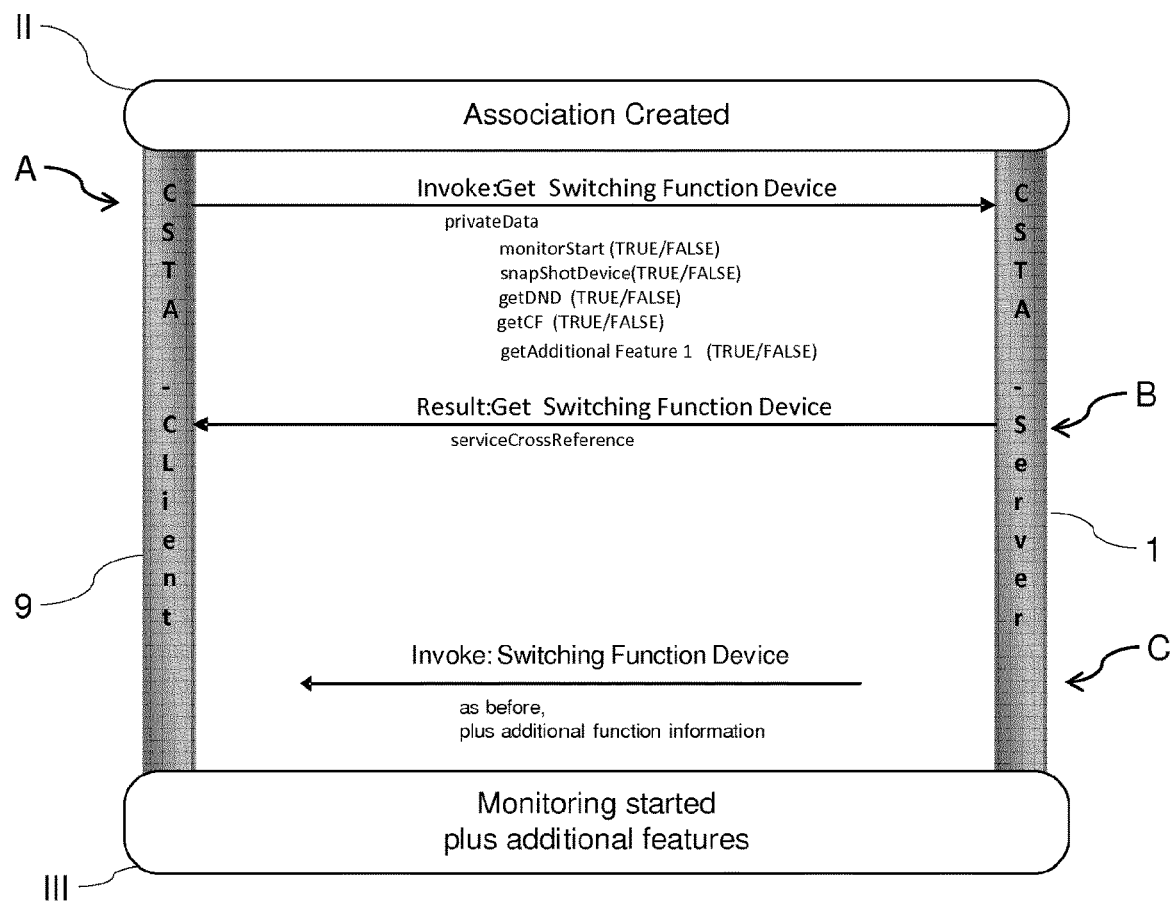
FIG. 11 is a schematic diagram illustrating communications exchanged between the switching device and a computing device in the communication system of FIG. 1, in another further exemplary embodiment of a monitor start process according to the present invention.

FIG. 11 is a sequence diagram showing a monitor start process 1100 between the CSTA client or first computing device 9 and the CSTA server or switching device 1 according to another further exemplary embodiment of the present invention. It is to be noted that this exemplary embodiment is a variant of monitor start process 1000 described above. Hence, mainly the differences from the latter will be described in detail, in the following, while any other aspects of monitor start process 1000 may be presumed to apply to the present exemplary embodiment directly or mutatis mutandis, unless explicitly stated otherwise or obviously being in contradiction to the descriptions of the present exemplary embodiment. For ease of illustration, however, messaging following the third message C is omitted, and certain contents of the second and third messages B, C are also omitted.

In this exemplary embodiment, additional features further to the standard features may be requested to be obtained within the same message flow as described above. This is done by providing further flags for any additional feature in the first message A sent to the switching device 1 by the first computing device 9. As a matter of example, a getAdditionalFeature1 flag for one additional feature #1 is added in message A shown in FIG. 11. In response, the switching device 1 will include additional function information in the parameter block of any allocated communication device, in addition to contents as already described before. This will further reduce the amount of CSTA MonitorStart, CSTA SnapshotDevice and CSTA "getter" sequences per device.

The monitor start process 1100 of this exemplary embodiment again ends with monitoring-started state III which additionally implies a state of additional features synchronized.

Multiple Computing Devices

As already mentioned above, embodiments of the communication system can also include a second computing device 10, which is shown in broken line in FIG. 1. For implementation and configuration of the second computing device 10, reference is made to the descriptions above regarding the first computing device 9.

The second computing device 10 can be configured to utilize the same methodology utilized by the first computing device 9 for communicating with the switching device 1 to initiate and performing monitoring of a service as illustrated in the exemplary methodology illustrated in FIG. 5 and any of FIGS. 6 to 11. For example, the second computing device 10 can be configured to establish a communication connection with the switching device 1 to perform monitoring of communication devices and functions of the network that the communication devices may utilize via the switching device 1. After establishment of the communication link between the switching device 1 and the second computing device 10 in analogy with the association establishment process 500, the second computing device 10 and switching device 1 can exchange messages to start an application and subsequently initiate second computing device monitoring. Therefore, the second computing device 10 may reach a similar association established state II as described above with the first computing device 9.

Figure 12:
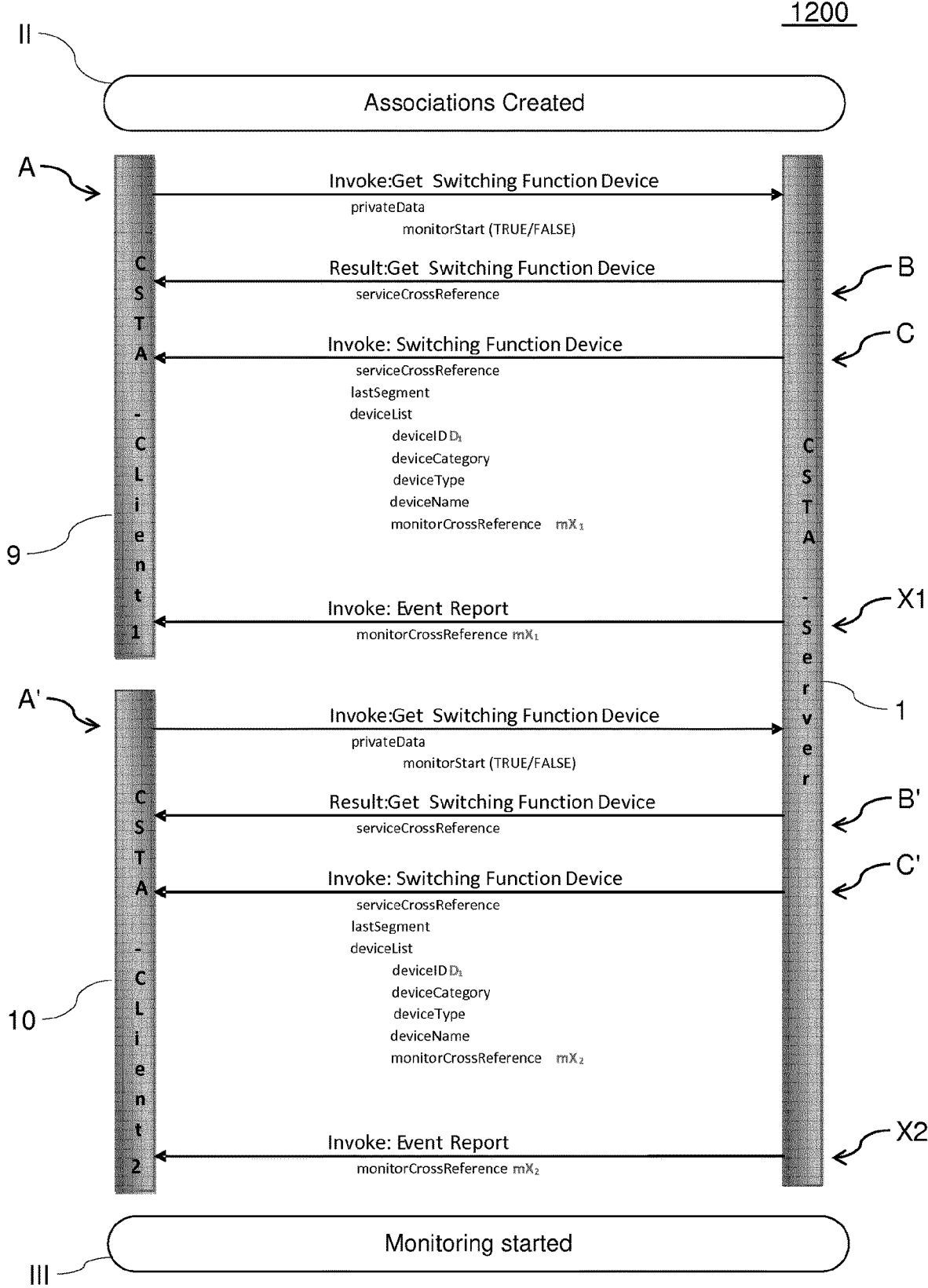
FIG. 12 is a schematic diagram illustrating communications exchanged between the switching device and computing devices in the communication system of FIG. 1, in yet another further exemplary embodiment of a monitor start process according to the present invention.

FIG. 12 is a sequence diagram showing a monitor start process 1200 between the first computing device 9 and the switching device 1, on the one hand side, and between the second computing device 10 and the switching device 1, on the other hand side, according to yet another further exemplary embodiment of the present invention. It is to be noted that this exemplary embodiment is a variant of monitor start process 600 described above. Hence, mainly the differences from the latter will be described in detail, in the following, while any other aspects of monitor start process 600 may be presumed to apply to the present exemplary embodiment directly or mutatis mutandis, unless explicitly stated otherwise or obviously being in contradiction to the descriptions of the present exemplary embodiment.

Like the monitor start process 600 shown in FIG. 6, in the monitor start process 1200 of the present exemplary embodiment, after the association is completed in association establishment process 500, the first computing device 9 sends a first message A configured as a get switching function device invoke or request message which is configured (e.g. designed or architected) in structure and content as a request for the switching device 1 to identify communication devices connected to the switching device that are to be monitored by the first computing device 9, by including/setting a CSTA MonitorStart flag TRUE or FALSE.

At the same time, the second computing device 10 sends a first message A' configured as a get switching function device invoke or request message which is configured (e.g. designed or architected) in structure and content as a request for the switching device 1 to identify communication devices connected to the switching device that are to be monitored by the second computing device 10, by including/setting a CSTA MonitorStart flag TRUE or FALSE.

In response to the first messages A and A', the switching device 1 sends a second message B back to first computing device 9 and a similarly configured second message B' back to second computing device 10.

The switching device 1 then sends a third message C that includes a listing of all of the communication devices allocated to be monitored by the first computing device 9 (deviceList) to the first computing device 9 and a similarly configured third message C' that includes a listing of all of the communication devices allocated to be monitored by the second computing device 10 (deviceList) to the second computing device 10. For the third messaged C, C', reference is made to what was described above in this regard. It is to be understood however that the listings of the third message C to the first computing device 9 includes other computing devices than the listings of the third message C' to the second computing device 10. The switching device 1 may decide which communication devices are to be monitored by which one of the first computing device 9 and the second computing device 10, based on the application initiated via the service request and response messages 542, 544 exchanged during the connection establishment execution alternative 540 described above. Any communication device allocated becomes a monitor object of first computing device 9 or the second computing device 10, and is addressable as a CSTA device-object. In the present exemplary embodiment, a first monitor object (communication device) mX1 and others are allocated to be monitored by the first computing device 9 as indicated in the third message C to the first computing device 9 while a second monitor object (communication device) mX2 and others are allocated to be monitored by the second computing device 10 as indicated in the third message C' to the second computing device 10.

The monitor start process 1200 is completed by the switching device 1 sending a first event report message X1 for the first monitor object mX1 as well as respective event report messages for each further monitor object assigned and allocated with the first computing device, to the first computing device 9, and sending a second event report message X2 for the second monitor object mX2 as well as respective event report messages for each further monitor object assigned and allocated with the second computing device 10. Then, the monitor start process 1200 ends with a monitoring-started state III which is understood as a monitoring-started state for the whole communication system.

<Further Variations, Adaptations, Options, and Modifications>

It should be appreciated that embodiments of the communication system and method for start-up of monitoring of monitor objects in the communication system can be modified to meet different sets of design criteria. For instance, the organization and structure of the network 2 in which the switching device 1 is positioned can be any type of suitable structure and organization. As another example, the first computing device 9 and/or second computing device 10 can be positioned in the network of the switching device 1 or may be positioned in a network that is remote to this network 2 or is external to the network 2. As yet another example, some embodiments of the communication system may utilize only one computing device to perform monitoring of one or more services or may utilize multiple computing devices that each monitor a respective service (e.g. at least two computing devices that each monitor a respective service, at least three computing devices that each monitor a respective service, etc.). As yet another example, the application initiated via the application start messaging sent by the first computing device 9 and the service monitored by the first computing device 9 can be related to a CSTA application, can be a CSTA related service, or other type of service. As yet another example, the service monitored by the second computing device 10 can be related to a CSTA application, can be a CSTA related service, or other type of service. As yet another example, the communication devices connected to the switching device 1 for use of one or more services can all be within the network 2, or only some of these communication devices may be within the network 2 while others are external to the network 2 and remotely connect to the switching device 1. In yet other embodiments, all the communication devices may be connected to the switching device 1 via at least one intermediate network. As yet another example, the communications exchanged between the computing devices and switching device may be configured to facilitate encryption, authentication, or otherwise be organized or configured to provide additional levels of security to the exchanged communications.

It will be understood that although the terms "first", "second" and "third" as used herein are to describe different elements, components, messages, devices and/or objects, rather than to limit these elements, components, messages, devices and/or objects should to those terms such as "first", "second" and "third". Those terms "first", "second" and "third" are merely used to distinguish one element, component, message, device and/or object from another element, component, message, device and/or object. Therefore, a first element, component, messages, device and/or object can be named as a second, third, or whatever element, component, message, device and/or object without departing from the teaching of the present invention.

While certain exemplary embodiments of the communication system and methods of making and using the same have been shown and described above, it is to be distinctly understood that the invention is not limited thereto but may be otherwise variously embodied and practiced within the scope of the appended claims.

As mentioned above, the processes 600, 700, 800, 900, 1000, 1100, 1200 have been described based on the fourth execution alternative 540 of process 500, i.e. based on service request and/or response messages 542, 544 being exchanged between the first computing device 9 (and/or second computing device 10). However, any execution alternative of process 500 may be employed. If an execution alternative of process 500 not providing information about the device-objects and/or call-objects available for monitoring by the first computing device 9 (and/or second computing device 10) is employed, such information had to be provided by other messaging, so as to enable a certain process as far as requiring for such information.

In an embodiment variant to any one of the aforementioned exemplary embodiments of a monitor start process, the content of the second and third messages B, C may all be included within a single second message B that is configured in structure and content to provide the acknowledgement to the first computing device 9 as well as providing the listing of devices to be monitored. In yet another embodiment variant, the acknowledgement of the second message B may not be made and the content and structure of the third message C may be sent as a single second message to both acknowledge receipt of the first message A and provide the listing of requested communication devices in a single response message. Such types of second messages can permit the switching device 1 to send a single response to the first computing device's first message A that includes a complete list of the communication devices to be monitored that is associated with the application or service initiated via the service request and response messages 542, 544. The list of communication devices can be used by the first computing device 9 to identify its associated and allocated communication devices and can also be used by the switching device 1 to provide monitor cross-reference identification in subsequent call control events involving one or more of the monitored communication devices that it may communicate to the first computing device 9.

The listing of devices provided by the switching device 1 in any of the aforementioned exemplary embodiments to identify all the communication devices to be monitored by the first computing device 9 can be a listing that is configured to identify each of the communication devices to be monitored in a number of different formats or structures. For instance, each device can be identified by an address such as a phone number or internet protocol address. As another example, each device can be identified by another type of identifier such as an identifier that is created by use of a pre-selecting identification format.

In a further embodiment variant, in response to a receipt of the listing of communication devices to be monitored from the switching device 1, the first computing device 9 can initiate monitoring by sending a monitor start message to the switching device 1 for monitoring of the communication devices identified by the switching device 1 in response to the second message B or third message C sent by the switching device that includes the listing of all the communication devices to be monitored by the first computing device 9. The monitoring may be performed by the first computing device 9 via communications with the switching device 1 such that the communication devices are unaware of the monitoring being performed by the first computing device 9. The monitor start message can be configured in structure and content to communicate a pre-selected or pre-defined identification that is to inform the switching device 1 that it is to activate device monitors for monitoring of all the communication devices listed in its response to the first message A. The monitor start message can therefore be configured as a bulk start monitor request that is configured in content and structure to initiate the starting of monitors for all the communication devices in a single message sent to the switching device 1. The identification of communication devices to be monitored in the monitor start message can be via a listing of the communication devices the switching device 1 provided to the first computing device 9 or can be by use of a pre-selected reference identifier that is configured to identify all of these communication devices to the switching device or can be by another type of structure and content of the monitor start message.

In this embodiment variant, the monitor start message can also include a filter identifier to identify the types of events that are to be monitored. Those events can range from any event that may involve the communication devices to be monitored or a filter that only requires communications to the first computing device 9 when a particular type of call event or other pre-selected types of call events or communication events are detected as involving one or more of the communication devices to be monitored by the first computing device 9.

In response to the monitor start message of this embodiment variant, the switching device can initiate the monitoring of the identified communication devices. The application linked to these communication devices via the exchanged service request and response messages 542, 544 can allow the switching device 1 to filter the type of events that the switching device 1 identifies to the first computing device 9 for facilitating monitoring of the communication devices that are identified (allocated) as being the communication devices to be monitored via the monitor start message. Additional filtering information included in the monitor start message may also be used by the switching device to filter what types of events require a monitoring message to be sent from the switching device 1 to the first computing device 9 for monitoring of the communication devices.

In this embodiment variant, the switching device 1 can also send an acknowledgement of the monitor start message to inform that first computing device 9 that the monitoring of the identified communication devices has been initiated by the switching device 1. The switching device 1 may then begin reporting event messages for those communication devices to the first computing device 9 to identify events associated with those communication devices and the application or service those communication devices are using that is to be monitored by the first computing device 9. For instance, when the monitoring is started at the switching device 1 in response to the monitor start message, the CSTA event flow from the switching device 1 can be initiated for all the communication devices listed in the listing of all of the communication devices to be monitored by the first computing device 9 that the switching device 1 previously communicated to the first computing device 9 in the fourth or third message C.

In a further embodiment variant, after initiation of the monitoring, the first computing device 9 can remove the active monitors at the switching device 1 to stop receiving event notifications. For instance, a monitor stop request can be sent to the switching device 1. The monitor stop request sent by the first computing device 9 can be configured in content and structure to identify all the communication devices to be monitored so that a single monitor stop request can be sent to the switching device 1 to initiate the stopping of the reporting of the events for all of these communication devices. In response to the monitor stop request, the switching device 1 may stop the reporting of events to the first computing device 9 for the communication devices identified in the monitor stop request (e.g. the communication devices assigned with a cross reference identifier included in the monitor stop request) and thereafter confirm receipt of the monitor stop request in an acknowledgement of the monitor stop request that is sent to the first computing device 9.

In this embodiment variant, the acknowledgment of the monitor stop request that is sent by the switching device 1 can include a different identifier than the identifier included in the monitor stop request message that is sent by the first computing device 9 to identify the communication devices that the switching device 1 will no longer be sending report events for in response to the monitor stop request. For example, a cross reference identifier (e.g. an xref identifier) that may be used in the monitor stop request message sent by the first computing device 9 can differ from the cross reference identifier used in the acknowledgement message sent by the switching device 1. The first computing device 9 may have data within its memory to allow it to cross reference the identifier included in the acknowledgement message sent by the switching device 1 with a listing of communication devices to identify the communication devices identified via that cross reference identifier. Likewise, data in memory that is accessible to the switching device 1 can include content that allows the switching device 1 to identify the communication devices identified by the cross reference identifier included in the monitor stop request sent by the first computing device 9.

Even if the afore-described embodiment variants have been described in view of a first computing device 9, they are as well applicable to a structure of more than one computing device, for example a first computing device 9, the second computing device 10, . . . , and applies to any first, second, third messages A1, A2, . . . , B1, B2, . . . , C1, C2, . . . described before.

As a consequence of a CSTA Service GetSwitchingFunctionDevices the CSTA Server generates a sequence of CSTA SwitchingFunctionDevices. In conjunction with the prior definitions the content of CSTA SwitchingFunctionDevices is enhanced as follows:

The according CSTA MonitorCrossReferences will be part of CSTA SwitchingFunctionData if automatic monitoring is requested by CSTA GetSwitchingFunctionDevices. This MonitorCrossReference is unique as required by ECMA-269 and used to assign a CSTA event to the according device.

A CSTA SnapshotCrossReferences will be part of CSTA SwitchingFunctionData if the Call Processing state query is requested by CSTA GetSwitchingFunctionDevices and the Call Processing state is not NULL. The SnapshotCrossReferences is used to transport all other Call Processing states.

The flag DoNotDisturbState shows the status of the feature "Do Not Disturb" per communication device. This information will be sent if requested by GetSwitchingFunctionDevices.

The flag CallForwardingState shows the status of the feature "Call Forwarding" per communication device. This information will be sent if requested by GetSwitchingFunctionDevices (CSTA "getter" service). If feature is enabled at a communication device the Client has to request additional information via CSTA GetForwarding.

The synchronization phase depends on the information needed by the CSTA Client. The examples may typically be used by Call Centre, UC and UCC applications. If for special solutions additional information is needed such as CSTA GetMessageWaitingIndicator or any other "getter" of ECMA-269 the implementation will follow one of the rules described above:

the result is direct part SwitchingFunctionDevice as a Flag or Parameter (like DoNotDisturb);

the result requires the ECMA-269 "getter" as additional service (like CallForwarding);

the result is cross reference (like SnapshotDevice).

Throughout the afore description, devices (i.e., communication devices or, more specifically, terminal devices) have been referred to as objects to be monitored. It will be noted that any device subject to monitoring may be represented by a respective monitor-object. Each one of the processes referring to communication devices or device-objects to be monitored may be easily adapted to include calls as a monitored object as well. In this sense, monitor-objects and call-objects may be generally understood to be monitor objects, and any monitor-object regardless of its kind may replace for a communication device to be monitored in any of the afore-described processes.

I.e., beside device monitoring CSTA allows call monitoring whereby monitors are set on calls but on devices. The described processes which are exemplary embodiments of a method of the present invention applies with the same rules for call monitoring as well.

It is to be highlighted that all of the afore-described exemplary embodiments, alternatives, options or variants may be combined with each other. As an example, any variant shown in FIGS. 7 to 11 to the exemplary embodiment of FIG. 6 may be adapted to apply in the multiple computing device structure of FIG. 12. Moreover, the number of computing devices in the communication system used for monitoring monitor objects is not limited to two but the second computing device 10 described above may be taken as an example for a deliberate number of further computing devices to first computing device 9.

<Result of the Inventive Method>

The described method allows a drastic reduction of start-up time between a CSTA Server and CSTA Client in comparison to the prior art which is independent of original conditions and defaults. This gives the advantage for "all-in-one" solutions, where Server and Client build a common unit, to synchronize within a shorter time frame. Any process may be understood as a method in the sense of the present invention.

By using the described method the maintenance effort of an "all-in-one" solution will be improved.

What is claimed is:

1. A method of monitoring monitor objects in a computer-integrated telecommunications environment, said method comprising, in an initial start-up phase:
upon a first-time establishment of an association between a first computing device and a switching device using a communication link, sending a first message from the first computing device to the switching device requesting an identification for all monitor objects that are to be monitored by the first computing device, the first message being a single message;
in response to the first message, sending a second message from the switching device to the first computing device, wherein the second message refers to a third message to follow, the second message being a single message;
after receiving the first message, the switching device allocating monitor objects which the first computing device is to monitor; and
sending the third message from the switching device to the first computing device, the third message referring back to the second message, the third message being a single message including a list of all monitor objects allocated to the first computing device for monitoring, wherein the list identifies all the monitor objects allocated to the first computing device, the list including a parameter block for each of the allocated monitor objects that includes information for enabling monitoring of the allocated monitor object at the first computing device.

2. The method of claim 1, wherein:
said parameter block for each allocated monitor object of the list includes:
an identifier,
at least one item of characterizing information selected from the group consisting of a category, type and name, and
a monitor reference configured such that events involving the monitor object of the parameter block are identifiable by the switch device to the first computer device.

3. The method of claim 1, wherein:
the request for identifying monitor objects to be monitored by the first computing device in the first message requests monitor objects for devices within at least one pre-selected device category.

4. The method of claim 1, wherein:
the request for identifying monitor objects to be monitored by the first computing device in the first message requests monitor objects within at least one pre-selected category of monitor objects.

5. The method of claim 1, wherein the first message also includes a request for a call processing state for the monitor objects to be monitored by the first computing device, and wherein the third message includes information relating to a call processing state for the allocated monitor object of the list that have an idle call processing state and also includes information indicating that at least one fourth message that is to follow the third message.

6. The method of claim 5, further comprising:
for each allocated monitor object identified in the third message that has a non-idle call processing state, sending the at least one fourth message from the switching device to the first computing device, each of the at least one fourth message providing information about calls associated with the allocated monitor object identified in the fourth message and having a reference identifier for the monitor object of the fourth message that corresponds to a reference identifier for the allocated monitor object of the fourth message included in the third message, wherein said monitor object is a device-object.

7. The method of claim 1, wherein the request for identifying monitor objects to be monitored by the first computing device in the first message from the first computing device to the switching device relates to at least one member of the group consisting of:
device-objects representing communication devices connected to the switching device, and
call-objects representing calls existing in the domain or sub-domain of the switching device or in the domain or sub-domain of any communication device connected to the switching device or anywhere else in a communication system the switching device belongs to.

8. The method of claim 1, wherein:
the first message also requests at least one feature status of one or more features of the allocated monitor objects; and
the third message indicates the requested at least one feature status of each allocated monitor object of the list, said information included in the parameter block of each allocated monitor object.

9. The method of claim 1, wherein:
said association establishment includes starting an application session.

10. The method of claim 1, wherein said method further comprising in an initial start-up phase:
upon a first-time establishment of an association between at least one second computing device and the switching device using a communication link, sending a supplemental first message each of the at least one second computing device to the switching device to request an identification for all monitor objects that are to be monitored by a respective second computing device;
in response to the supplemental first message from each of the at least one second computing device to the switching device, sending a supplemental second message from the switching device to each of the at least one second computing device, the supplemental second message referring to a respective supplemental third message to follow;
allocating monitor objects which each respective second computing device is to monitor; and
sending the respective supplemental third message from the switching device to each of the at least one second computing device, each third message referring back to the respective supplemental second message, and as a single message including a list of all monitor objects allocated to the respective second computing device for monitoring, wherein the list identifies all the monitor objects allocated to the first computing device, the list including a parameter block for each of the allocated monitor objects that includes information for enabling monitoring of the allocated monitor object at the respective second computing device.

11. The method of claim 10, wherein:
allocation of monitor objects is such that each monitor object is allocated to only one of the first computing device or one of the at least one second computing device for monitoring.

12. An apparatus for monitoring monitor objects in a computer-integrated telecommunications environment, the apparatus comprising:
a first computing device and a switching device, the switching device comprising a processor and a non-transitory computer readable medium, the first computing device comprising a processor and a non-transitory computer readable medium,
the first computing device communicatably connectable to the switching device via a communication link such that, upon a first-time establishment of an association between the first computing device and the switching device using the communication link, a first message is sent from the first computing device to the switching device requesting an identification for all monitor objects that are to be monitored by the first computing device, the first message being a single message;
the switching device configured to respond to the first message by sending a second message from the switching device to the first computing device, the second message being a single message, wherein the second message refers to a third message to follow and is also configured to allocate monitor objects that the first computer device is to monitor;
the switching device configured to send the third message to the first computing device, the third message referring back to the second message, and wherein the third message is a single message including a list of all monitor objects allocated to the first computing device for monitoring, wherein the list includes a parameter block for each of the monitor objects of the list, each parameter block of the list including information for enabling monitoring of the allocated monitor object of the parameter block at the first computing device.

13. A communication system comprising at least one apparatus of claim 12.

14. The apparatus of claim 12, wherein the second message and the third message are sent during the initial start-up phase, the initial start-up phase associated with starting up of at least one application via the communication link.

15. The apparatus of claim 12, wherein the first message also includes a request for a call processing state for the monitor objects to be monitored by the first computing device, and wherein the third message includes information relating to a call processing state for the allocated monitor object of the list that have an idle call processing state and also includes information indicating that at least one fourth message that is to follow the third message.

16. The apparatus of claim 15, wherein the switching device is configured to send the at least one fourth message to the first computing device for each allocated monitor object identified in the third message that has a non-idle call processing state, each of the at least one fourth message providing information about one or more calls associated with the allocated monitor object identified in the fourth message and having a reference identifier for the monitor object of the fourth message that corresponds to a reference identifier for the allocated monitor object of the fourth message included in the third message, wherein said monitor object is a device-object.

17. The apparatus of claim 12, wherein:
the first message also requests at least one feature status of one or more features of the allocated monitor objects; and
the third message indicates the requested at least one feature status of each allocated monitor object of the list, said information included in the parameter block of each allocated monitor object.

18. The apparatus of claim 12, wherein each parameter block for each allocated monitor object of the list includes:
an identifier,
at least one item of characterizing information selected from the group consisting of a category, type and name, and
a monitor reference configured such that events involving the allocated monitor object of the parameter block are communicatable by the switch device to the first computer device by inclusion of the monitor reference.

19. The apparatus of claim 12, comprising:
a second computing device connectable to the switch device.

20. An apparatus comprising:
a switching device, the switching device comprising a processor and a non-transitory computer readable medium,
the switching device configured so that, upon a first-time establishment of an association between the a first computing device and the switching device using a communication link, the switching device is configured to receive a first message from the first computing device that requests an identification for all monitor objects that are to be monitored by the first computing device, the first message being a single message;
the switching device also configured to respond to the first message by sending a second message from the switching device to the first computing device, the second message being a single message, wherein the second message refers to a third message to follow and is also configured to allocate monitor objects that the first computer device is to monitor;
the switching device also configured to send the third message to the first computing device, the third message referring back to the second message, and wherein the third message is a single message including a list of all monitor objects allocated to the first computing device for monitoring, wherein the list includes a parameter block for each of the monitor objects of the list, each parameter block of the list including information for enabling monitoring of the allocated monitor object of the parameter block at the first computing device.

* * * * *